United States Patent
Kim et al.

(10) Patent No.: US 8,352,000 B2
(45) Date of Patent: Jan. 8, 2013

(54) MOBILE PHONE HAVING DUAL CONNECTION MEMBER AND HINGE DEVICE THEREOF

(75) Inventors: Jong-Yang Kim, Seoul (KR); Yoo-Seok Yoon, Seoul (KR); Soo-Ik Jung, Seoul (KR); Seung-Hee Hyun, Incheon (KR); Kyeong-Won Lim, Seoul (KR)

(73) Assignees: Samsung Electronics Co., Ltd., Suwon-si (KR); JMC Co., Ltd., Inchon (KR)

( * ) Notice: Subject to any disclaimer, the term of this patent is extended or adjusted under 35 U.S.C. 154(b) by 1118 days.

(21) Appl. No.: 11/842,386

(22) Filed: Aug. 21, 2007

(65) Prior Publication Data

US 2008/0051162 A1 Feb. 28, 2008

(30) Foreign Application Priority Data

Aug. 22, 2006 (KR) .................................. 2006-79246
Jan. 15, 2007 (KR) .......................... 10-2007-0004345
Jun. 8, 2007 (KR) .......................... 10-2007-0055784

(51) Int. Cl.
*H04M 1/00* (2006.01)
(52) U.S. Cl. ................ 455/575.3; 455/575.1; 455/575.4
(58) Field of Classification Search ..... 455/575.1–575.8
See application file for complete search history.

(56) References Cited

U.S. PATENT DOCUMENTS

2004/0224732 A1  11/2004  Lee et al.
2006/0030381 A1*  2/2006  Byun et al. ................. 455/575.4
2006/0172764 A1  8/2006  Makino

FOREIGN PATENT DOCUMENTS

| CN | 1551600 A | 12/2004 |
|---|---|---|
| CN | 1816065 A | 8/2006 |
| EP | 1 475 943 A1 | 11/2004 |
| EP | 1 686 769 A1 | 8/2006 |
| EP | 1 783 985 A1 | 5/2007 |
| KR | 10-2004-0025624 A | 3/2004 |
| KR | 10-2006-0120304 A | 11/2006 |
| KR | 1020050090987 | * 4/2007 |
| KR | 10-2007-0056831 A | 6/2007 |

* cited by examiner

*Primary Examiner* — Lana N Le
*Assistant Examiner* — Hsin-Chun Liao
(74) *Attorney, Agent, or Firm* — Jefferson IP Law, LLP

(57) ABSTRACT

A dual connection member allowing a liquid crystal display unit and a keypad of a mobile phone to rotate and a hinge device thereof are provided. The dual connection member may be used in a mobile phone wherein the mobile phone includes a first housing, a second housing and a dual connection member for interconnecting the first housing and the second housing in such a manner that the second housing is rotatable about a first hinge axis toward or away from the first housing, wherein the first and second housings are connected to the dual connection member in such a manner as to be rotatable about third and second hinge axes, respectively, which extend perpendicular to the front and rear faces of the first and second housings, respectively, the third and second hinge axes being eccentrically positioned in relation to the centers of the first and second housings, respectively, and allowed to be slid as the first and second housings are rotated.

23 Claims, 44 Drawing Sheets

MOBILE PHONE HAVING DUAL CONNECTION MEMBER AND HINGE DEVICE THEREOF

PRIORITY

This application claims the benefit under 35 U.S.C. §119(a) of three Korean patent applications filed in the Korean Industrial Property Office on Aug. 22, 2006, Jan. 15, 2007 and Jun. 8, 2007, and assigned Serial Nos. 2006-79246, 2007-4345 and 2007-55784, respectively, the entire disclosures of all of which are hereby incorporated by reference.

JOINT RESEARCH AGREEMENT

The claimed invention was made by, on behalf of, and/or in connection with one or more of the following parties to a joint university-corporation research agreement: JMC Co. Ltd and Samsung Electronics Co. Ltd. The agreement was in effect on and before the date the claimed invention was made, and the claimed invention was made as a result of activities undertaken within the scope of the agreement.

BACKGROUND OF THE INVENTION

1. Field of the Invention

The present invention relates to a mobile phone having a hinge. More specifically, the present invention relates to a mobile phone having a dual connection member which allows a liquid crystal display unit and a keypad of the mobile phone to be rotated, and a hinge device thereof.

2. Description of the Related Art

Typically, a "mobile phone" refers to an appliance carried by a user so as to perform wireless communication with a counterpart. Such mobile phones are classified into various types on the basis of the external appearance thereof. For example, such mobile phones may be classified into a bar-type, a flip-type or a folder-type. A bar-type mobile phone means a mobile phone having a single housing formed in a bar shape, a flip-type mobile phone means a mobile phone including a bar-type housing and a flip, which are interconnected with each other by a hinge device, and a folder-type mobile phone means a mobile phone having a single bar-type housing, to which a folder is rotatably connected by a hinge device, so that the folder is foldable in relation to the housing.

In addition, such mobile phones may be classified into a rotation-type mobile phone or a sliding-type mobile phone on the basis of how to open or close them. A rotation-type mobile phone means a mobile phone having two housings which are rotatably connected with each other, so that the mobile phone is opened or closed by rotating the two housings in a state in which the two housings confront with each other, and a sliding-type mobile phone means a mobile phone having two housings, wherein the mobile phone is opened or closed by longitudinally moving the two housings in a state in which the two housings confront with each other. The above-mentioned various types of mobile phones will be easily understood by one having an ordinary knowledge in the art.

Light-weight, thin, simple and small-sized mobile phones are the most prevalent of the conventional mobile phones of the above-mentioned various types but have a disadvantage in that they are convenient only when a user performs voice or image communication with a counterpart.

As mobile communication services have been gradually diversified, mobile phones have developed into multi-media appliances. However, mobile phones have not yet got out of the conventional types of mobile phones, such as the folder-type, the sliding-type, etc. In addition, although the users' tastes have been diversified as the use of mobile phones has been generalized, the types of mobile phones have not yet satisfied the diversified tastes of users.

In order to solve the above-mentioned disadvantages, a display rotation-type mobile phone has been developed.

Such a mobile phone allows a user to rotate the display device of the folder thereof so as to watch moving images or video programs through a wide screen.

However, such a conventional display rotation-type mobile phone is inconvenient in using a keypad arranged in the longitudinal direction in the main body of the mobile phone when the keypad is used in a game mode function, although the mobile phone is convenient in watching moving images or video programs merely by rotating the display device of the folder.

In addition, the conventional display rotation-type mobile phone is provided with a hinge axis for the folder at the center of the folder. Therefore, if the folder is rotated about the hinge axis, a space is formed between the folder and the main body of the mobile phone. Furthermore, such a space is always produced whenever the folder is rotated, which causes the size of the mobile phone to be increased and acts as a primary factor that hinders the miniaturization of the mobile phone.

SUMMARY OF THE INVENTION

An aspect of the present invention is to address the above-mentioned problems and/or disadvantages occurring in the prior art and provide the advantages described below. Accordingly, an aspect of the present invention is to provide a mobile phone and a hinge device thereof having a dual connection member, wherein the dual connection member is configured to allow rotation of a liquid crystal display unit and a keypad of the mobile phone, so that the liquid crystal display unit and the keypad can be selectively rotated according to a mode of using the mobile phone, thereby improving convenience in using the mobile phone.

Another aspect of the present invention is to provide a mobile phone and a hinge device thereof having a dual connection member, wherein the dual connection member is configured to allow rotation of a liquid crystal display unit and a keypad of the mobile phone, and hinge axes are arranged to be movable and eccentrically positioned, so that the liquid crystal display unit and the keypad are positioned adjacent to each other, whereby it is possible to improve convenience in using the mobile phone and to reduce a redundant space, which is required for rotation of the liquid crystal display unit in a conventional mobile phone, and it is thus possible to miniaturize the mobile phone.

In accordance with an aspect of the present invention, a mobile phone is provided. The mobile phone includes a first housing, a second housing and a dual connection member for interconnecting the first housing and the second housing in such a manner that the second housing is rotatable about a first hinge axis toward or away from the first housing, wherein the first and second housings are connected to the dual connection member while being rotatable about third and second hinge axes, respectively, the third and second hinge axes extend perpendicularly to the front and rear faces of the first and second housings and are eccentrically positioned in relation to centers of the first and second housings, respectively, and the dual connection member causes the third and second hinge axes to be slid as the first and second housings are rotated.

In accordance with another aspect of the present invention, a hinge device of a mobile phone is provided. The mobile phone includes a first housing, a second housing, and a dual connection member for interconnecting the first housing and the second housing in such a manner that the second housing is rotatable about a first hinge axis toward or away from the first housing, the first and second housings being connected to the dual connection member in such a manner that they are respectively rotatable about second and third hinge axes which extend perpendicularly to the front and rear faces of the first and second housings, respectively. The hinge device includes link members assembled to the first and second housings, respectively, first and second rotary members rotatably connected to the link members, first and second guide portions formed in the dual connection member for receiving the first and second rotary members so as to guide the rectilinear movement of the first rotary members and the curvilinear movement of the second rotary members when the first and second rotary members rotate about the second and third hinge axes, as well as to rectilinearly guide the second and third hinge axes, so that the first and second housings are centrally positioned with reference to the dual connection member, elastic members connected to the first rotary members and the dual connection member so as to provide force for allowing the first and second rotary members to be rectilinearly and curvilinearly move and elastic connection members for connecting the elastic members to the first rotary members and the dual connection member.

BRIEF DESCRIPTION OF THE DRAWINGS

The above and other aspects, features and advantages of exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 5:
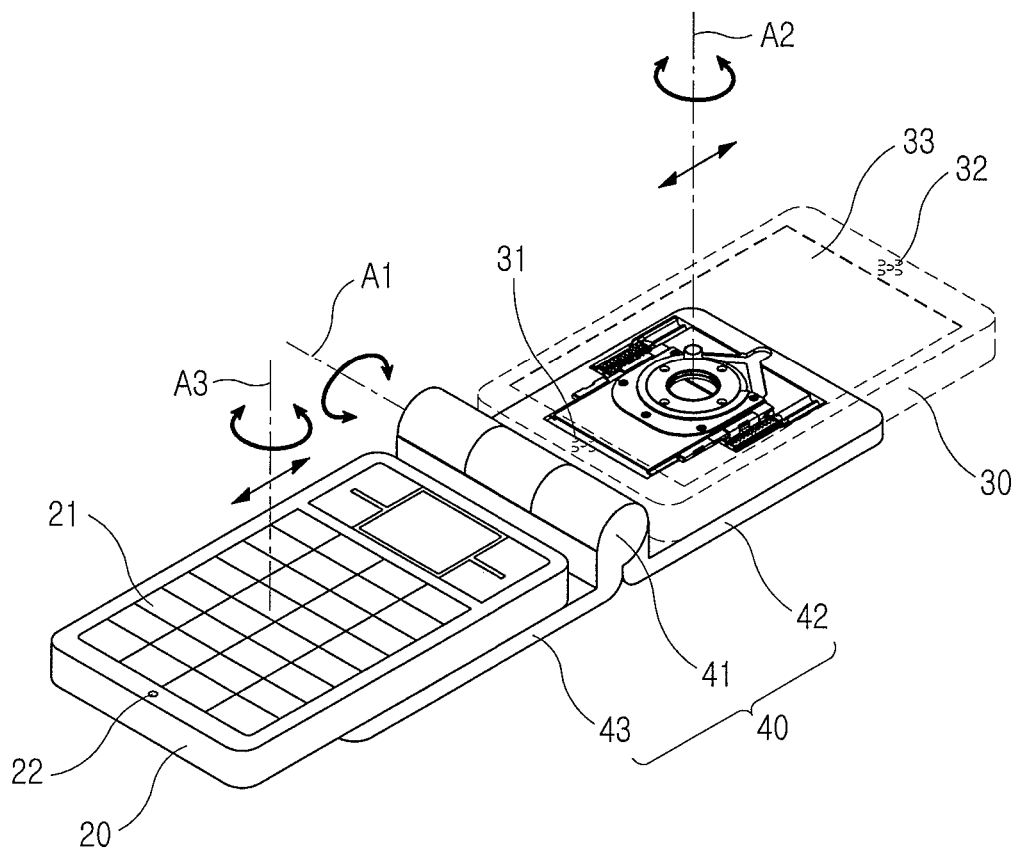
FIG. 5 is a perspective view illustrating a mobile phone having a dual connection member according to an exemplary embodiment of the present invention in a state in which the mobile phone is rotated about a first hinge axis of the hinge device.

As illustrated in FIG. 5, an exemplary mobile phone 10 includes a first housing 20, a second housing 30 and a dual connection member 40. The first housing 20 includes a keypad 21 and a microphone 22. The second housing 30 includes first and second speakers 31 and 32 and a large-scaled liquid crystal display unit 33. The dual connection member 40 includes first, second and third connection members 41, 42 and 43.

Figure 6:
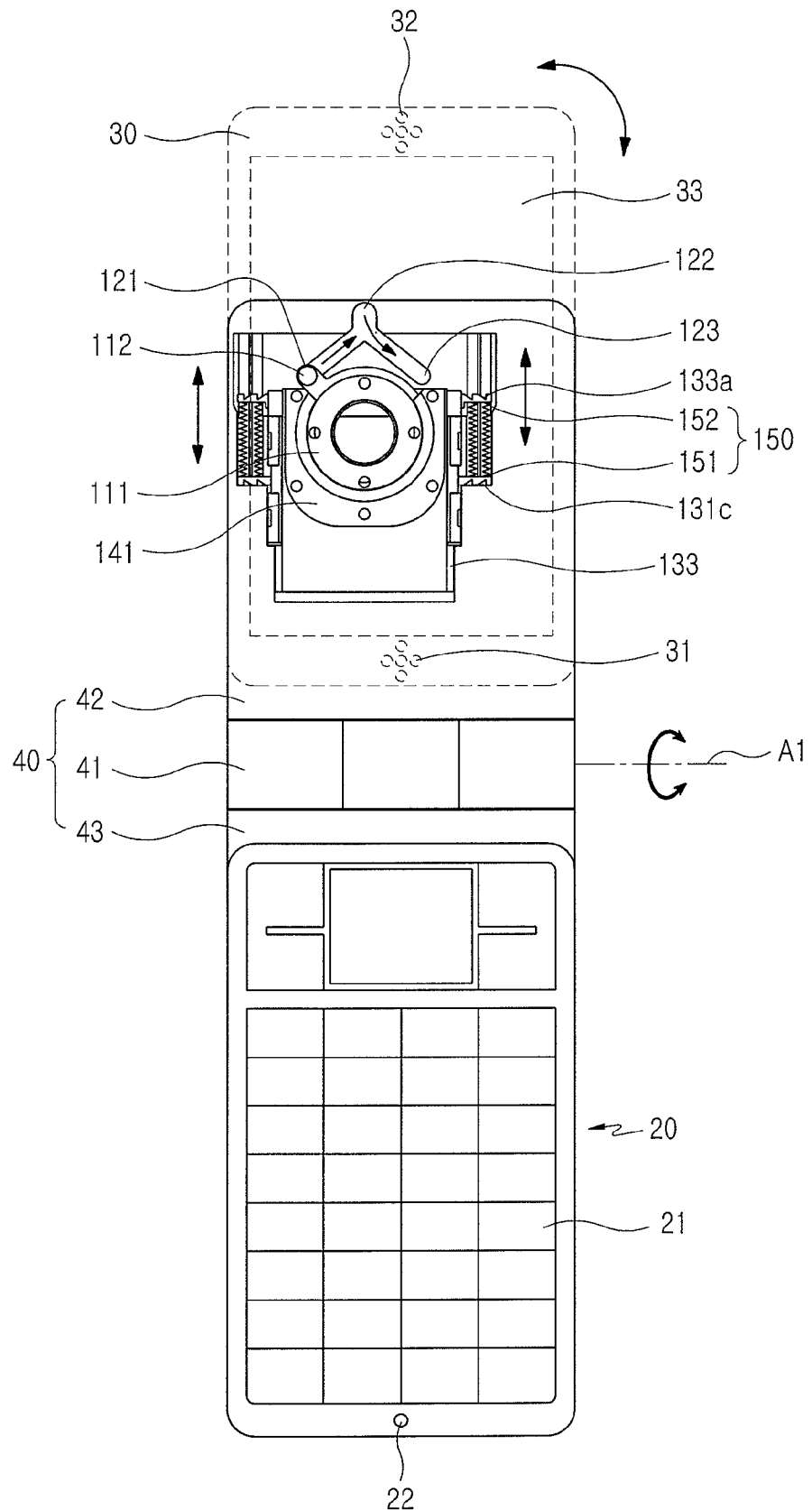
FIG. 6 is a top plan view illustrating a mobile phone having a dual connection member according to an exemplary embodiment of the present invention in a state in which the mobile phone is rotated about the first hinge axis of the hinge device.

As illustrated in FIGS. 5 and 6, the first connection member 41 provides a first hinge axis A1 and is connected to the second and third connection members 42 and 43, which will be described later, so that the second housing 30 is connected to the first housing 20 while being rotatable about the first hinge axis A1 toward or away from the first housing 20.

As illustrated in FIGS. 7, 8, 9 and 10, the second connection member 42 provides a second hinge axis A2, which is eccentrically positioned in relation to the center of the second housing 30. The second housing 30 is connected to the second connection member 42 while being rotatable about the second hinge axis A2 extending perpendicular to the rear face of the second housing 30. Further, the second connection member 42 is rotatably connected to the first connection member 41, thereby allowing the second hinge axis A2 to slide as the second housing 30 is rotated.

As illustrated in FIGS. 11 to 14, the third connection member 43 provides a third hinge axis A3, which is eccentrically positioned in relation to the center of the first housing 20. The first housing 20 is connected to the third connection member 43 while being rotatable about the third hinge axis A3 extending perpendicular to the front face of the first housing 20. The third connection member 43 is rotatably connected to the first connection member 41, thereby allowing third hinge axis A3 to slide as the first housing 20 is rotated.

Figure 10:
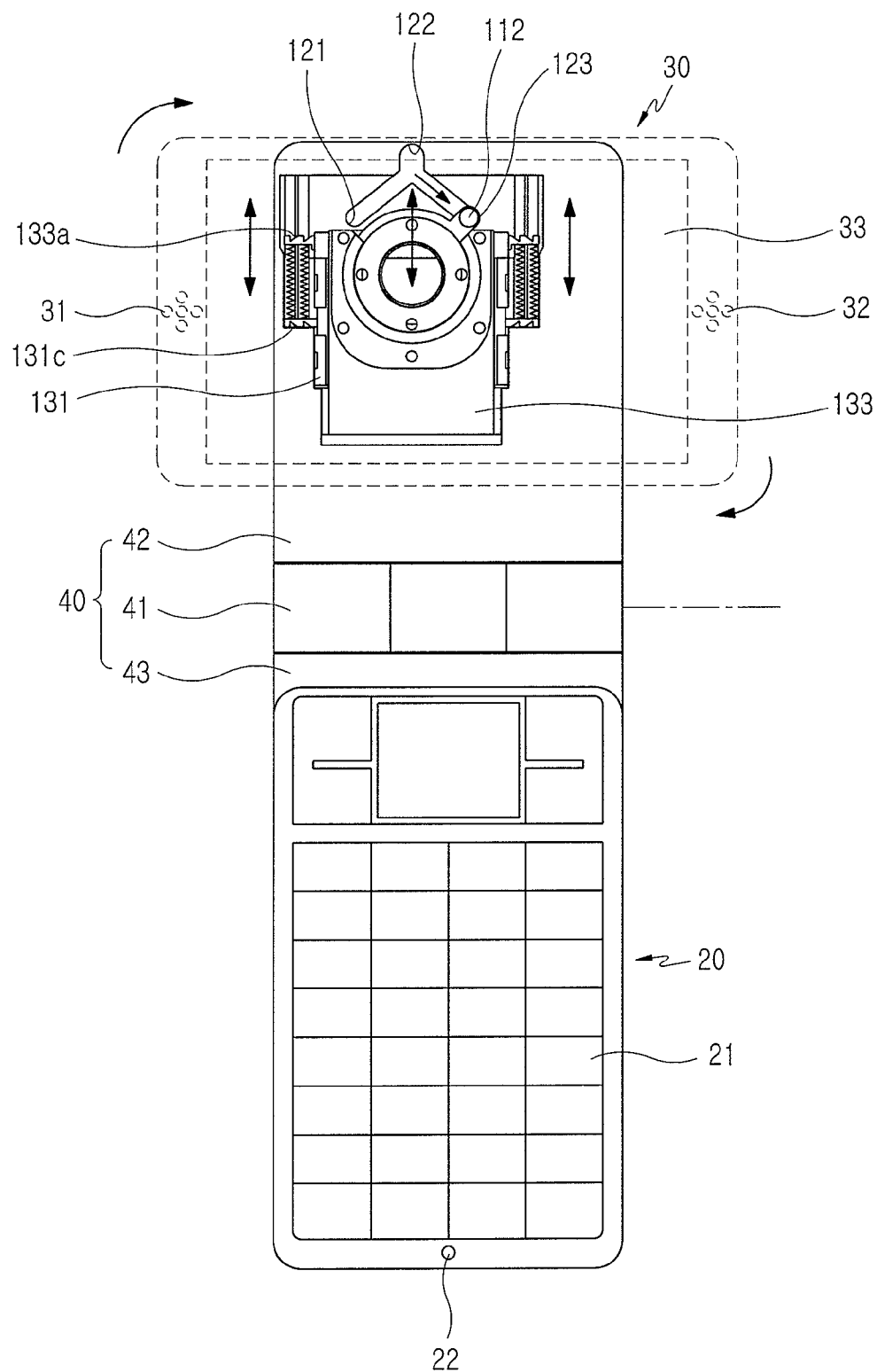
FIG. 10 is a top plan view illustrating a mobile phone having a dual connection member according to an exemplary embodiment of the present invention in a state in which the mobile phone is rotated about the second hinge axis of the hinge devices.

As illustrated in FIG. 10, if the second housing 30 is rotated about the second axis A2, the first and second housings 20 and 30 are positioned in an arrangement with a shape of "T."

Figure 14:
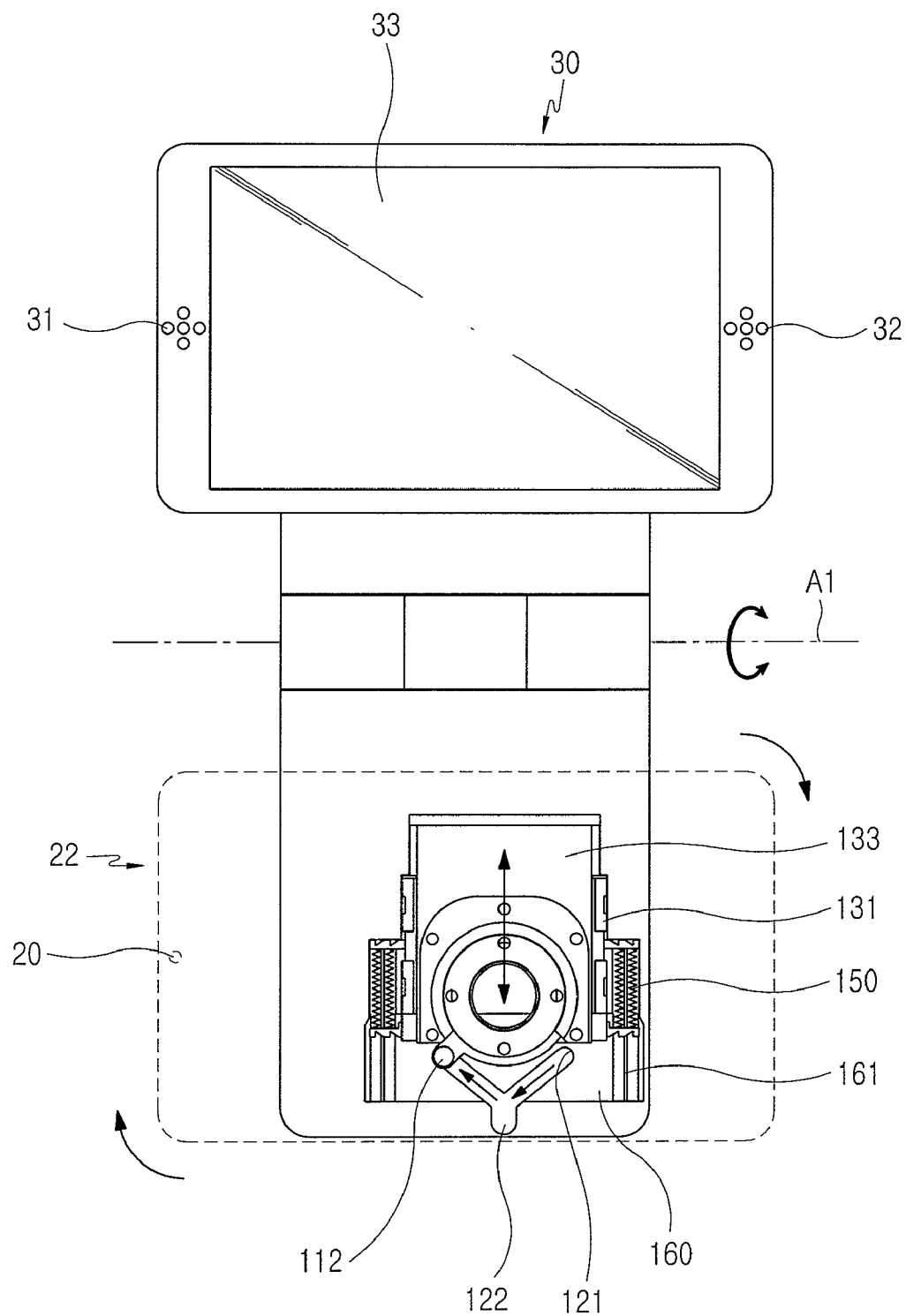
FIG. 14 is a top plan view illustrating a mobile phone having a dual connection member according to an exemplary embodiment of the present invention in a state in which the mobile phone is rotated about the third hinge axis of the hinge devices.

As illustrated in FIG. 14, if the first and second housings 20 and 30 are rotated about the third and second hinge axes A3 and A2, respectively, the first and second housings 20 and 30 are positioned in an arrangement with a shape of "I."

As illustrated in FIGS. 1 to 4, a hinge device 100 of a mobile phone 10 with a dual connection member includes a first or second housing 20 or 30, a dual connection member 40, a rotary member 110, a guide means 120, a guide movement member 130, a holder 140, and an elastic means 150. The rotary member 110 provides the second or third hinge axis A2 or A3 and is connected to the first or second housing 20 and 30 in such a manner that, when the first or second housing 20 or 30 rotates, the rotary member 110 slides while rotating together with the first or second housing 20 or 30. The guide means 120 is formed in the dual connection member 40 so as to guide the rotary member 110 according to the rotation of the first or second housing 20 or 30. The guide movement member 130 is connected to the dual connection member 40 in such a manner that the guide movement member 130 rotatably connects the rotary member 110 with the dual connection member 40 and slidably guides the rotary member 110. The holder 140 is connected with the guide movement member 130 while rotatably supporting the rotary member 110. The elastic means 150 is disposed in the guide movement member 130 and provides an elastic force for allowing the rotary member 110 to be rotated and slid.

Figure 4:
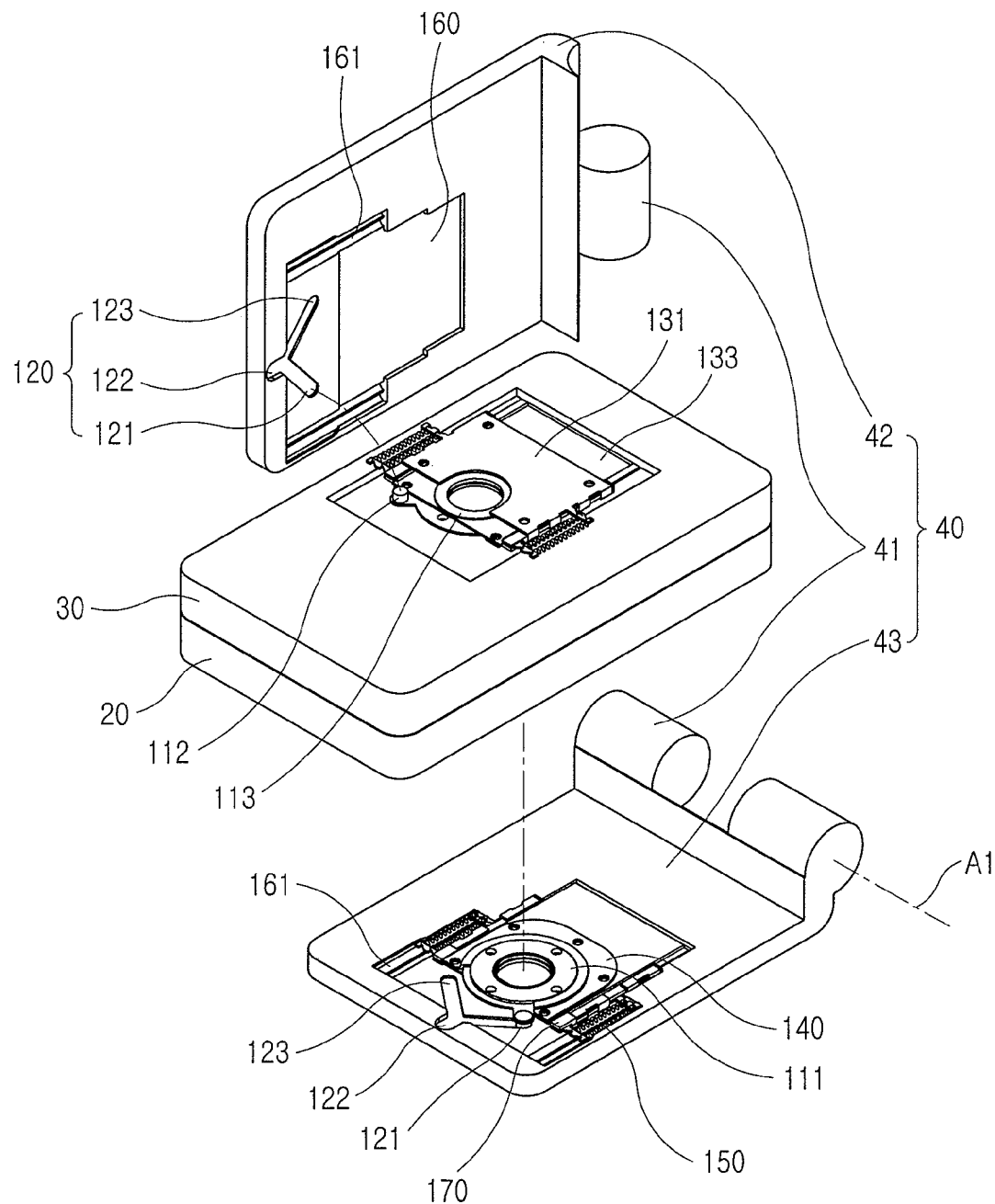
FIG. 4 is an exploded perspective view illustrating a mobile phone having a dual connection member according to an exemplary embodiment of the present invention before the dual connection member is assembled among the components of the hinge devices of the mobile phone.

As illustrated in FIG. 4, the second and third connection members 42 and 43 are formed with mounting recesses 160, respectively, and the hinge devices 100 are mounted in the mounting recesses 160, respectively.

Figure 2:
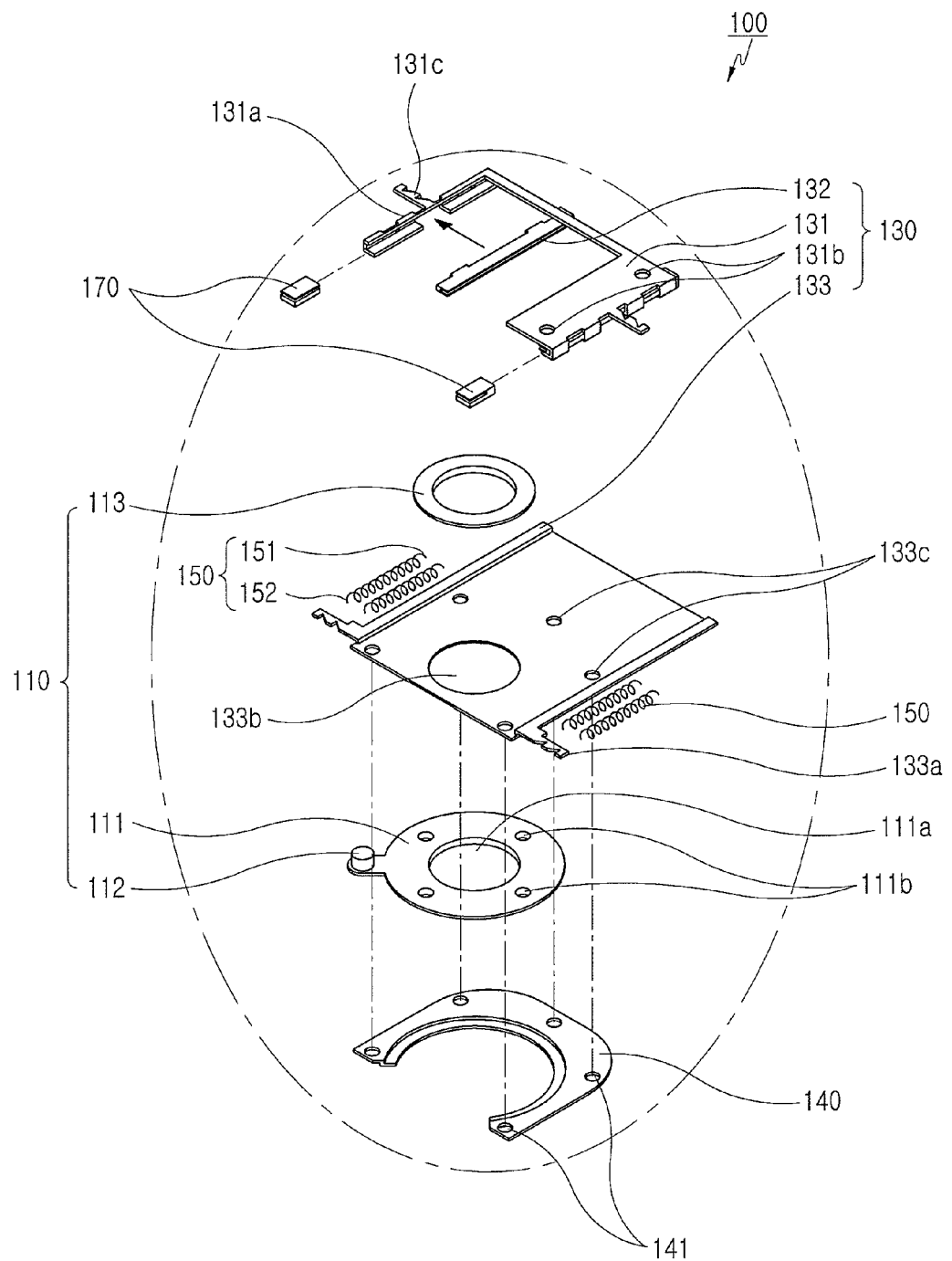
FIG. 2 is an enlarged exploded perspective view of the "A" part in FIG. 1.
Figure 3:
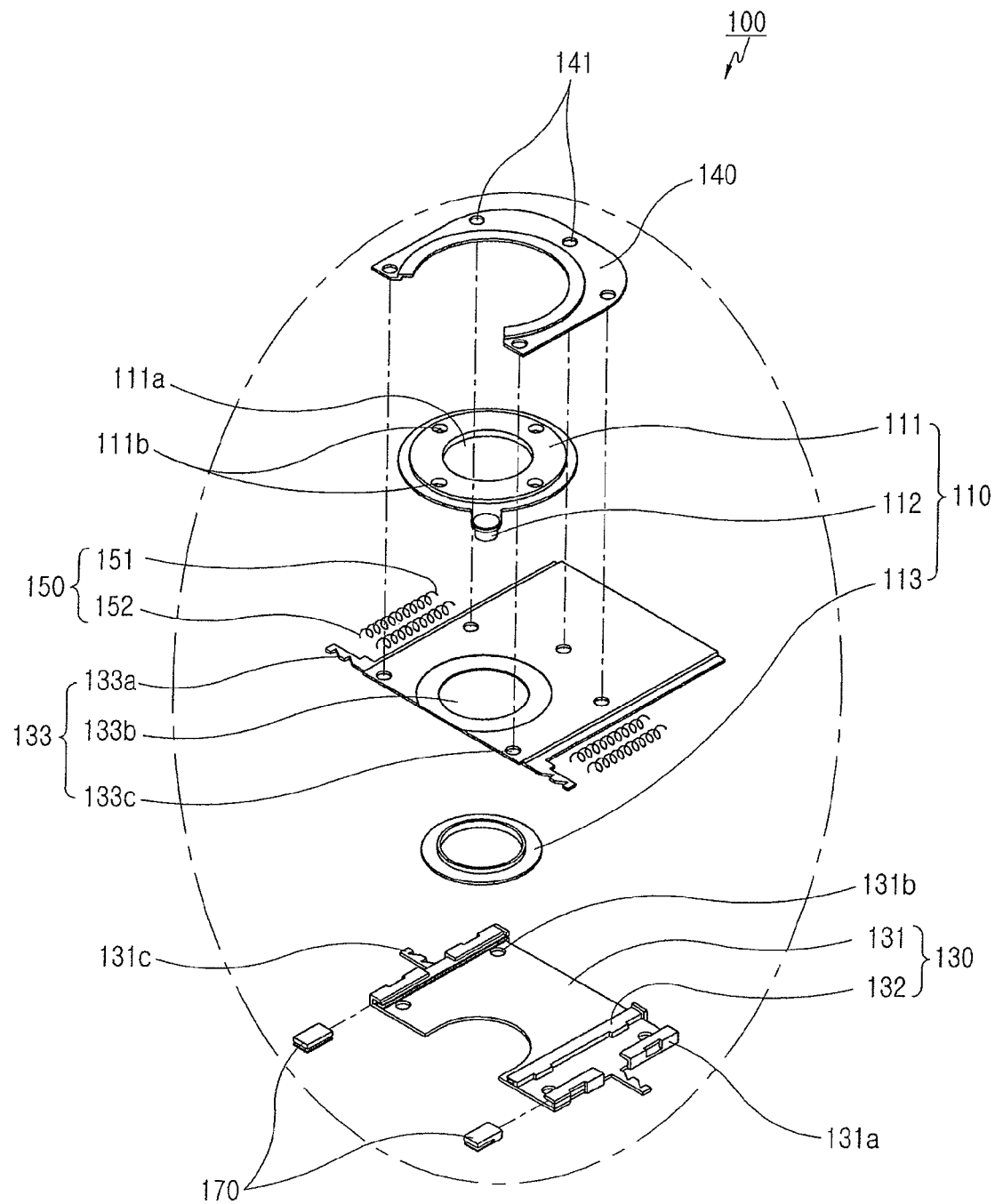
FIG. 3 is an enlarged exploded perspective view of the "B" part in FIG. 1.

As illustrated in FIGS. 2 and 3, the rotary member 110 includes a rotator 111, a guide pin 112, and a washer 113. The rotator 111 is provided between a guide rail 133 of the guide movement member 130 and the holder 140, so that the rotator 111 is also slid and rotated when the first or second housing 20 or 30 is rotated. The guide pin 112 projects from the circumference of the rotator 111, so that it is engaged in and moves along the guide means 120, which is formed in a corresponding mounting recess 160, when the first or second housing 20 or 30 rotates. The washer 113 is fitted through the rotator 111 and the guide rail 133, so that it supports the rotation of the rotator 111.

As illustrated in FIGS. 3 and 4, a through-hole 111a is formed through the central area of the rotator 111, through which the washer 113 can be fitted, and one or more fastening areas 111b are formed around the through-hole 111a, so that the rotator 111 can be fastened to the first or second housing 20 or 30.

As illustrated in FIG. 4, the guide means 120 includes a guide groove 120, which is formed in the mounting recess 160, so that the rotary member 110 can be guided along the guide groove 120 when the first or second housing 20 or 30 rotates.

As illustrated in FIGS. 2 and 3, the guide movement member 130 includes a guide member 131, a pair of guide bars 132 and a guide rail 133. The guide member 131 is fitted in the corresponding mounting recess 160 so as to slidably guide the guide rail 133. The guide bars 132 are mounted on opposite sides of the guide member 131 so that the guide bars 132 can be slidably engaged with the guide rail 133. The guide rail 133 is fastened to the holder 140, so that the rotator 111 is rotatably interposed between the holder 140 and the guide rail 133. Further, the guide rail 133 is adapted to be slidably engaged with the guide bars 132.

Figure 1:
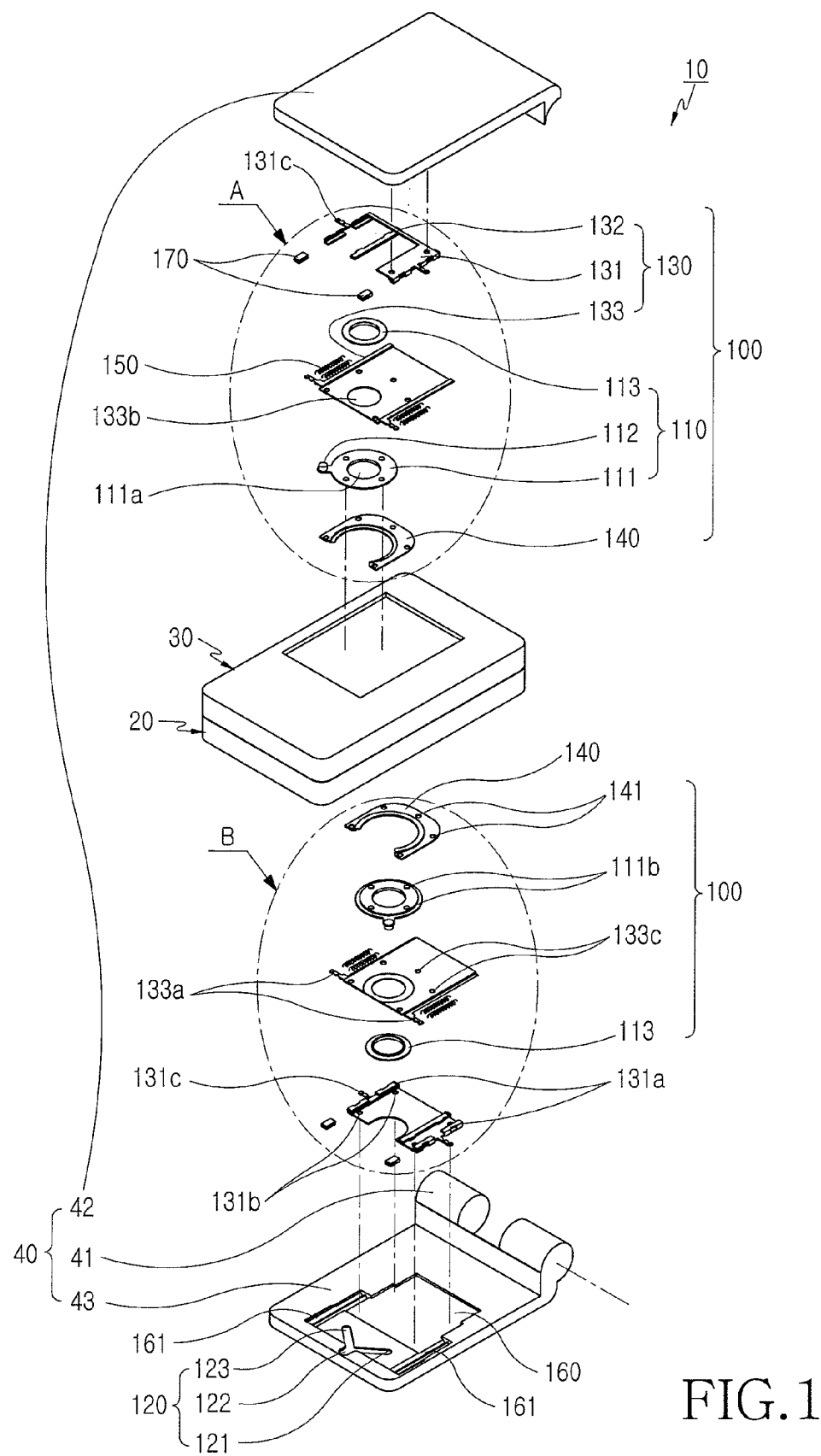
FIG. 1 is an exploded perspective view illustrating a hinge device of a mobile phone having a dual connection member according to an exemplary embodiment of the present invention.

As illustrated in FIGS. 1 and 2, a pair of mounting areas 131a are formed on opposite side areas of the guide member 131, so that the guide bars 132 can be mounted. The guide member 131 is formed with one or more fastening areas 131b at the top end thereof, to which the second or third connection member 42 or 43 is fastened.

As illustrated in FIGS. 3 and 4, the guide rail 133 is formed with a through-hole 133b, through which the washer 113 is inserted, and one or more fastening areas 133c, wherein the first or second housing 20 or 30 is fastened by aligning the fastening areas 133c with the connection holes 141 formed through the holder 140 and fastening screws through the aligned holes 133c and 141.

As illustrated in FIGS. 3 and 4, the elastic means 150 includes a plurality of spring members 150, which are interposed between the opposite side areas of the guide member 131 and the guide rail 133. The spring members 150 are arranged in such a manner that one end 151 of each spring member 150 is engaged with one of first spring anchoring members 131c projecting from the opposite side areas of the guide member 131, and the other end 152 is engaged with one of second spring anchoring members 133a projecting from the opposite side areas of the guide rail 133.

As illustrated in FIG. 4, each of the mounting recesses 160 is formed with spring operation grooves 161 which provide spaces for operation of the spring members 150.

As illustrated in FIGS. 2 and 3, the guide member 131 includes a pair of dampers 170, each of which is placed at one end of each of the opposite side areas of the guide member 131, so that, when the guide rail 133 is run against the guide member 131 due to the movement of the guide rail 133, the dampers 170 can absorb the shock.

As illustrated in FIGS. 4, 6, 8 and 10, the guide groove 120 is provided with first, second and third stopper areas 121, 122 and 123. The first stopper area 121 is adapted to come into contact with the guide pin 112, thereby stopping the guide movement of the guide pin 112, when the first or second housing 20 or 30 rotates about the second or third hinge axis A2 or A3 from the transverse orientation to the longitudinal orientation of the first or second housing 20 or 30. The second stopper area 122 is adapted to cause the guide pin to enter the second stopper area 122 and then escape from the second stopper area 122, thereby passing by the second stopper area 122, when the guide pin 112 performs the guide movement along the guide groove 120 and arrives at the center of the guide groove 120. The third stopper area 123 is adapted to come into contact with the guide pin 112, thereby stopping the guide movement of the guide pin 112, when the first or second housing 20 or 30 rotates about the second or third hinge axis A2 or A3 from the longitudinal orientation to the transverse orientation of the first or second housing 20 or 30.

Now, the operating procedure of the hinge devices of the mobile phone with the dual connection member having the above-mentioned construction according to an exemplary embodiment of the present invention will be described in more detail with reference to FIGS. 1 to 16.

As illustrated in FIGS. 1 and 5, a mobile phone 10 with a dual connection member includes first and second housings 20 and 30, and a dual connection member 40.

The dual connection member 40 includes first, second and third connection members 41, 42 and 43.

The second and third connection members 42 and 43 are interconnected through the first connection member 41 while being rotatable about a first hinge axis A1 in relation to each other.

The second connection member 42 is connected with the second housing 30 while being rotatable about the second hinge axis A2 in relation to each other, wherein the second housing 30 includes first and second speakers 31 and 32 and a large-sized liquid crystal display unit 33.

The third connection member 43 is connected with the first housing 20 in such a manner that they are rotatable about the third hinge axis A3 in relation to each other, wherein the first housing is provided with a keypad 21 and a microphone 22.

As illustrated in FIGS. 1 to 4, the hinge devices 100 are provided between the first and second housings 20 and 30 and between the second and third connection members 42 and 43, respectively. Each of the hinge devices 100 includes a rotary member 110, a guide means 120, a guide movement member 130, a holder 140, and an elastic means 150. The rotary member 110 has a rotator 111 that is rotatably connected to the top or bottom surface of the holder 140, and the guide movement member 130 has a guide rail 133 that is provided on the top or bottom surface of the rotary member 110. In this state, a through-hole 111a formed through the rotator 111 and a through-hole 133b formed through the guide rail 133 are aligned with each other, and a washer 113 for supporting the rotation of the rotator 111 is fitted through the through-holes 111a and 133b.

As illustrated in FIGS. 2 and 3, a guide member 131 is rotatably connected with the guide rail 133. At this time, because a pair of guide bars 132 are mounted on the opposite sides of the guide member 131, the guide rail 133 is slidably engaged with the guide bars 132. The guide member 131 has a pair of dampers 170, each of which is provided at one end of opposite sides of the guide member 131, so that the dampers 170 absorb shock occurring when the guide rail 133 slides and collides with the guide member 31. In this state, one or more fastening areas 133c are aligned with the connection holes 141 formed in the holder 140, and screws (not shown) are fastened through the aligned holes 133c and 141.

In this state, as illustrated in FIG. 1, one or more fastening areas 111b formed around the through-hole 111a of each of the rotators 111 are fastened to the first or second housings 20 and 30. The fastening areas 131b formed in each of the guide members 131 are fastened to the second or third connection members 42 and 43 by screws (not shown). At this time, the hinge devices 100 are mounted in mounting recesses 160, respectively, wherein the mounting recesses 160 are formed on the second and third connection members 42 and 43, respectively, and the guide pins 112 of the rotary members 110 are engaged in the guide grooves 120 formed in the mounting recesses 160, respectively.

As illustrated in FIG. 4, one end 151 of each spring member 150 is engaged with one of first spring anchoring members 131c projecting outwardly from the opposite sides of the guide member 131, respectively. In this state, the other end 152 of each spring member 150 is engaged with second anchoring members 133a projecting outwardly from the opposite sides of the guide rail 133.

In this state, if the user wants to use the mobile phone 10 in a communication mode, the second housing 30 is rotated about the first hinge axis A1 of the first connection member 41 so that the second housing 30 moves away from the first housing 20, as illustrated in FIGS. 5 and 6. Then, the first and second housings 20 and 30 are positioned in a longitudinal orientation.

Figure 7:
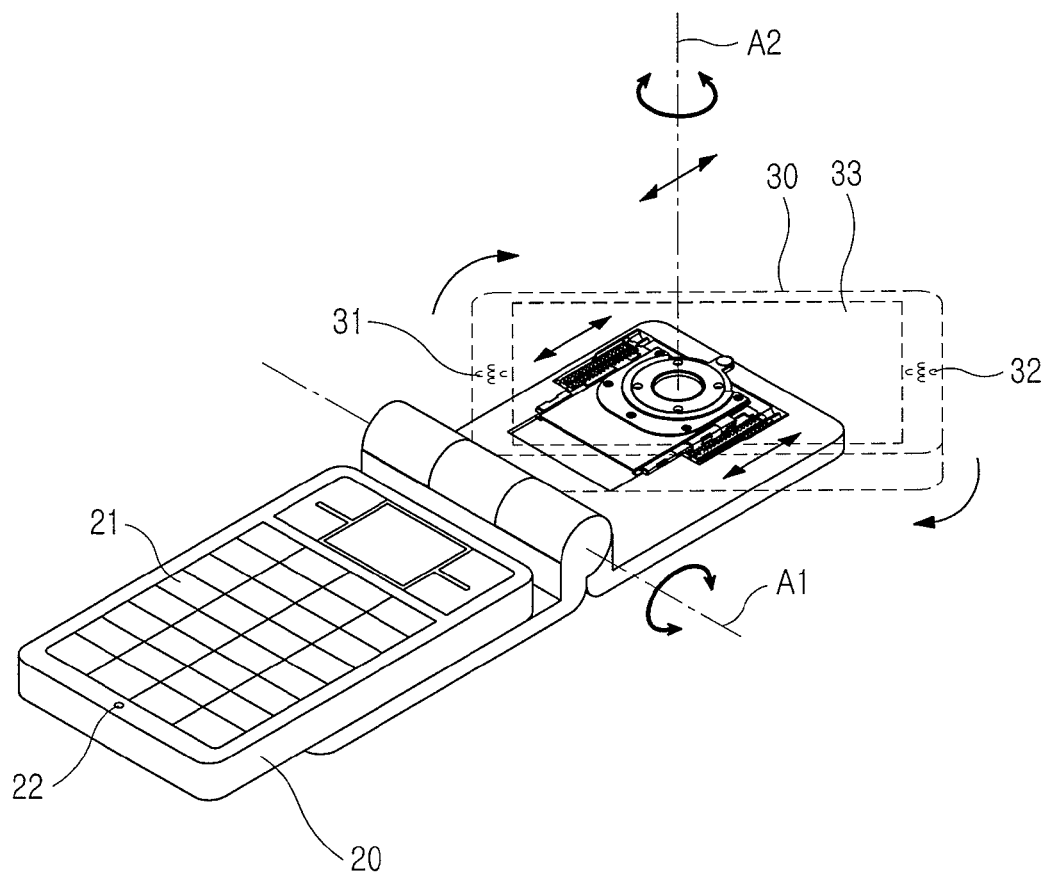
FIG. 7 is a perspective view illustrating a mobile phone having a dual connection member according to an exemplary embodiment of the present invention in the process of rotating the mobile phone about a second hinge axis of the hinge device.
Figure 8:
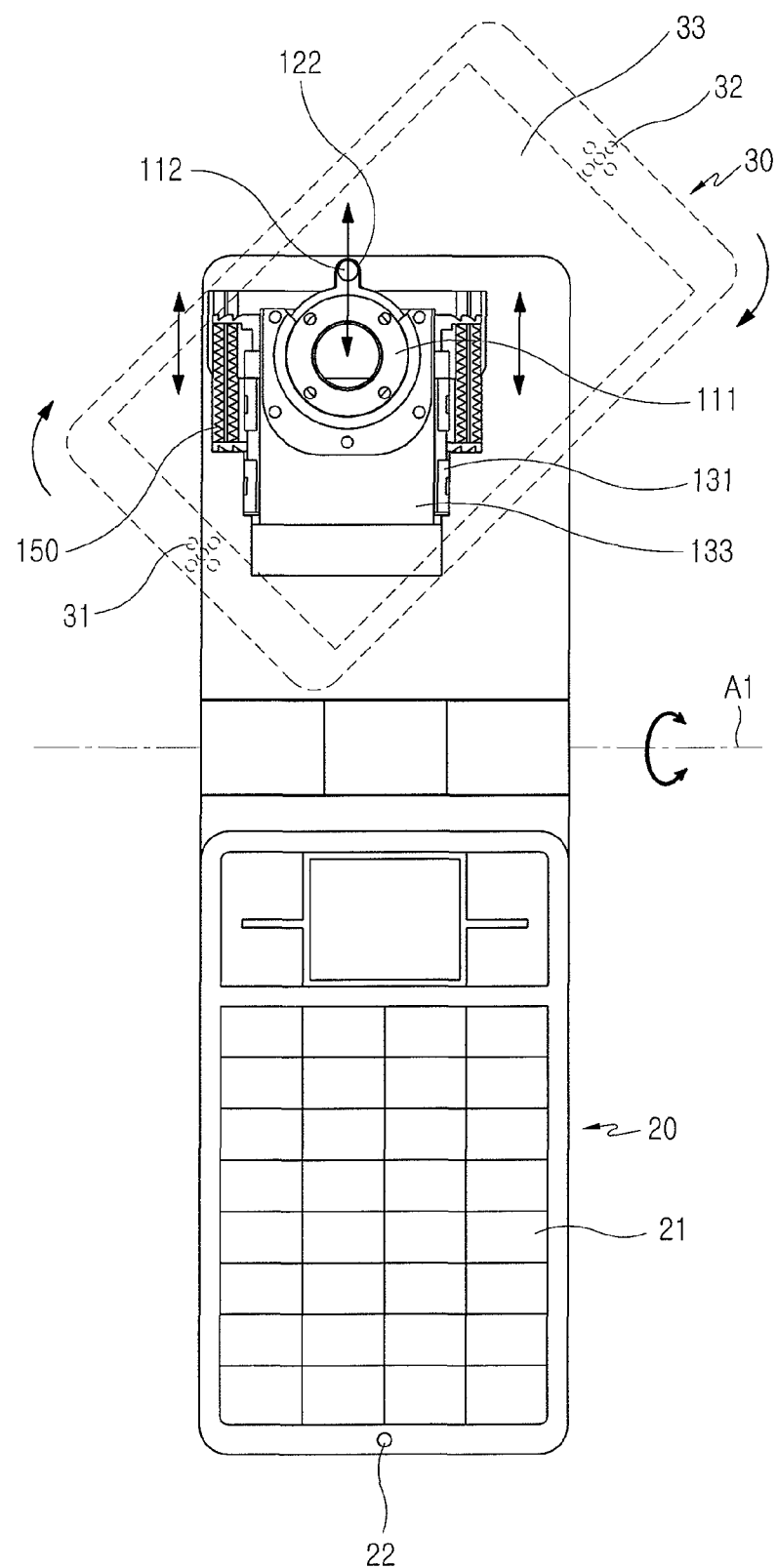
FIG. 8 is a top plan view illustrating a mobile phone having a dual connection member according to an exemplary embodiment of the present invention in the process of rotating the mobile phone about the second hinge axis of the hinge devices.

In this state, if the user wants to watch TV or a moving image through the large-sized liquid crystal display unit 33, the second housing 30 is rotated to the transverse orientation about the second hinge axis A2, as illustrated in FIGS. 7 and 8.

At this time, as the second housing 30 is rotated, the corresponding rotator 111 is also moved together with the second housing 30, and the guide pin 112 of the rotator 111 is slid along the corresponding guide groove 120.

As the rotator 111 is slid, the corresponding holder 140 and the corresponding guide rail 133 are also moved.

At this time, the guide pin 112 escapes from the first stopper area 121 of the corresponding guide groove 120 and then is inserted into the second stopper 122.

At this time, the second hinge axis A2 of the rotator 111 is slid from the lower part to the upper part of the second housing 30.

Figure 9:
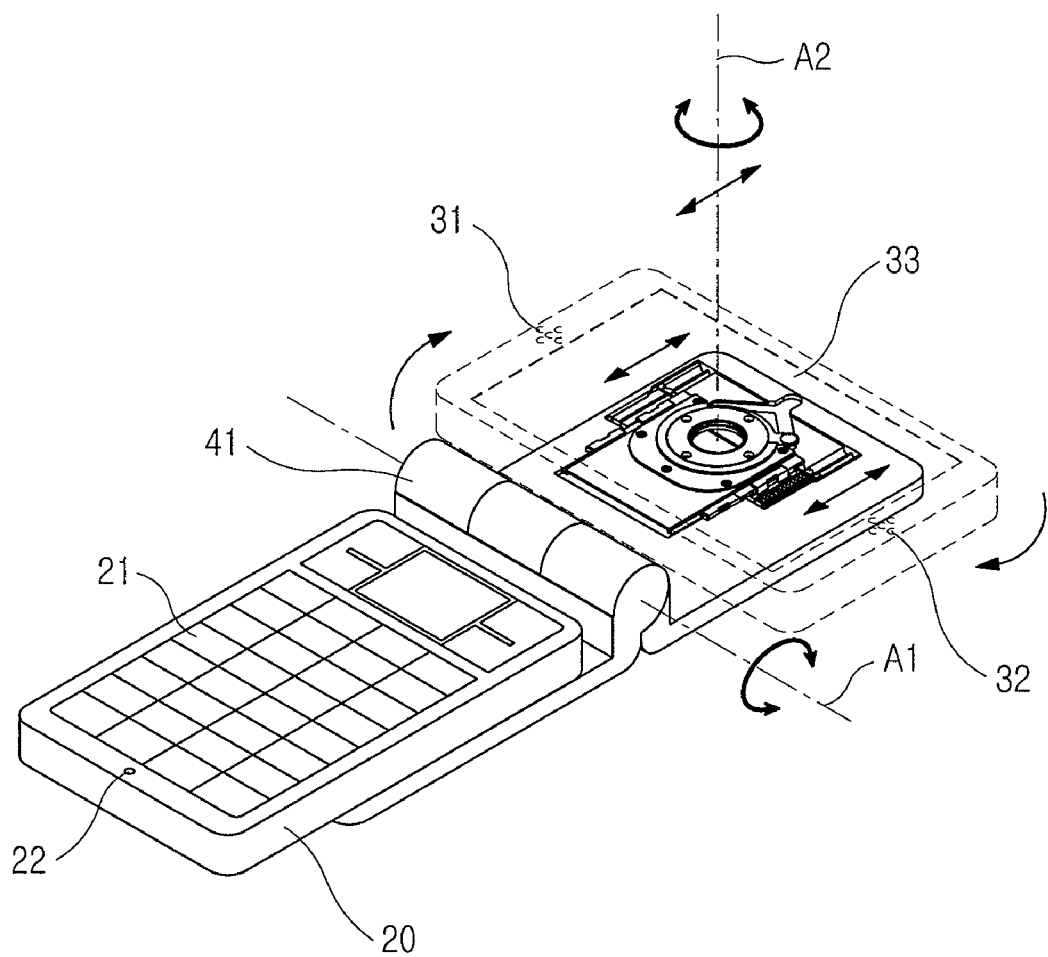
FIG. 9 is a perspective view illustrating a mobile phone having a dual connection member according to an exemplary embodiment of the present invention in a state in which the mobile phone is rotated about the second hinge axis of the hinge device.

In this state, as illustrated in FIGS. 9 and 10, if the second housing 30 is rotated 90 degrees from the longitudinal orientation to the transverse orientation about the second hinge axis A2, the corresponding guide pin 112 escapes from and passes by the second stopper area 122 formed at the center of the corresponding guide groove 120, slides along the guide groove 120, and then comes into contact with the second stopper area 123, thereby stopping the sliding movement.

At this time, the second hinge axis A2 of the rotator 111 is slid from the upper part to the lower part of the second housing 30 while being rotated, thereby returning to its original position, and the guide rail 133 is also slid.

At this time, the guide member 131 and the spring members 150 provided on the guide rail 133 cause the guide pin 112 to be rotated and slid along the guide groove 120 with an elastic force.

At this time, the guide rail 133 can be slid by the guide bars 132 of the guide member 131.

The guide rail 133 and the rotator 111 return to their original positions again, and the guide pin 112 comes into contact with the third stopper area 123.

The guide rail 133 and the rotator 111 are rotated and slid in the up and down directions in relation to the second housing 30.

As illustrated in FIG. 10, the first and second housings 20 and 30 are positioned in an arrangement shaped like "T."

Here, if the second housing 30 is reversely rotated about the second hinge axis A2 in order to return the second housing 30 to its original position from the transverse orientation to the longitudinal orientation, the rotator 111 and the guide rail 133 are rotated and slid again, and the guide pin 112 escapes from the second stopper area 123 of the guide groove, enters and then escapes from the second stopper area 122, and then comes into contact with the first stopper area 121, thereby stopping the rotation and sliding movement. Then, the second housing 30 is returned to its original position in the longitudinal orientation.

The spring members 150 provide an elastic force which enables the rotator 111 and the guide rail 133 to be rotated and slid.

The guide rail 133 and the rotator 111 are rotated and slid in up and down directions in relation to the second housing 30.

Figure 11:
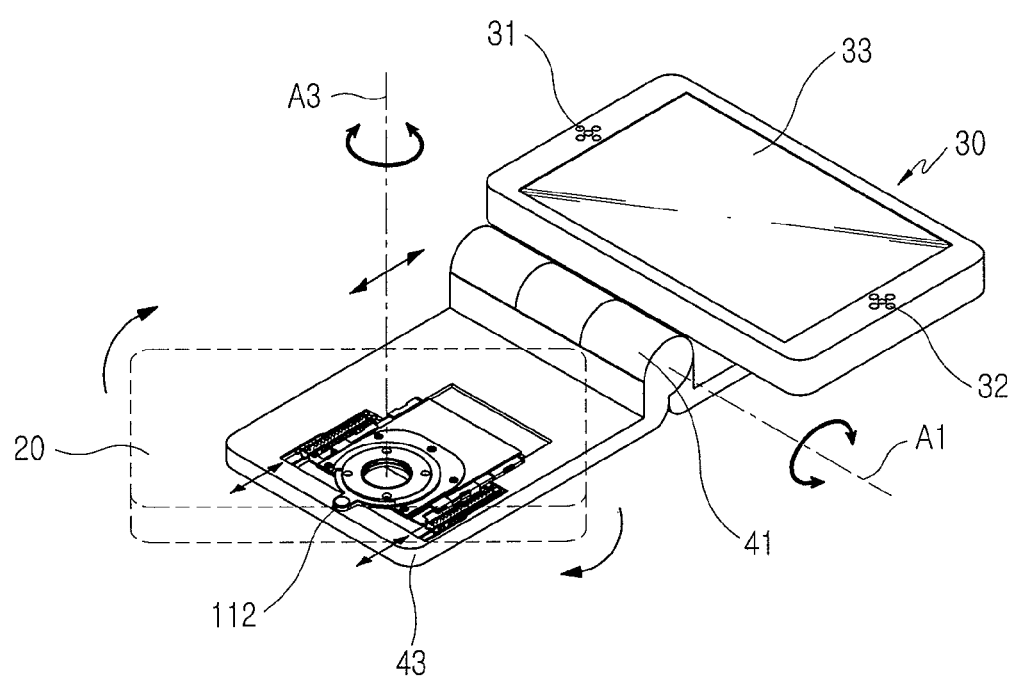
FIG. 11 is a perspective view illustrating a mobile phone having a dual connection member according to an exemplary embodiment of the present invention in the process of rotating the mobile phone about a third hinge axis of the hinge devices.
Figure 12:
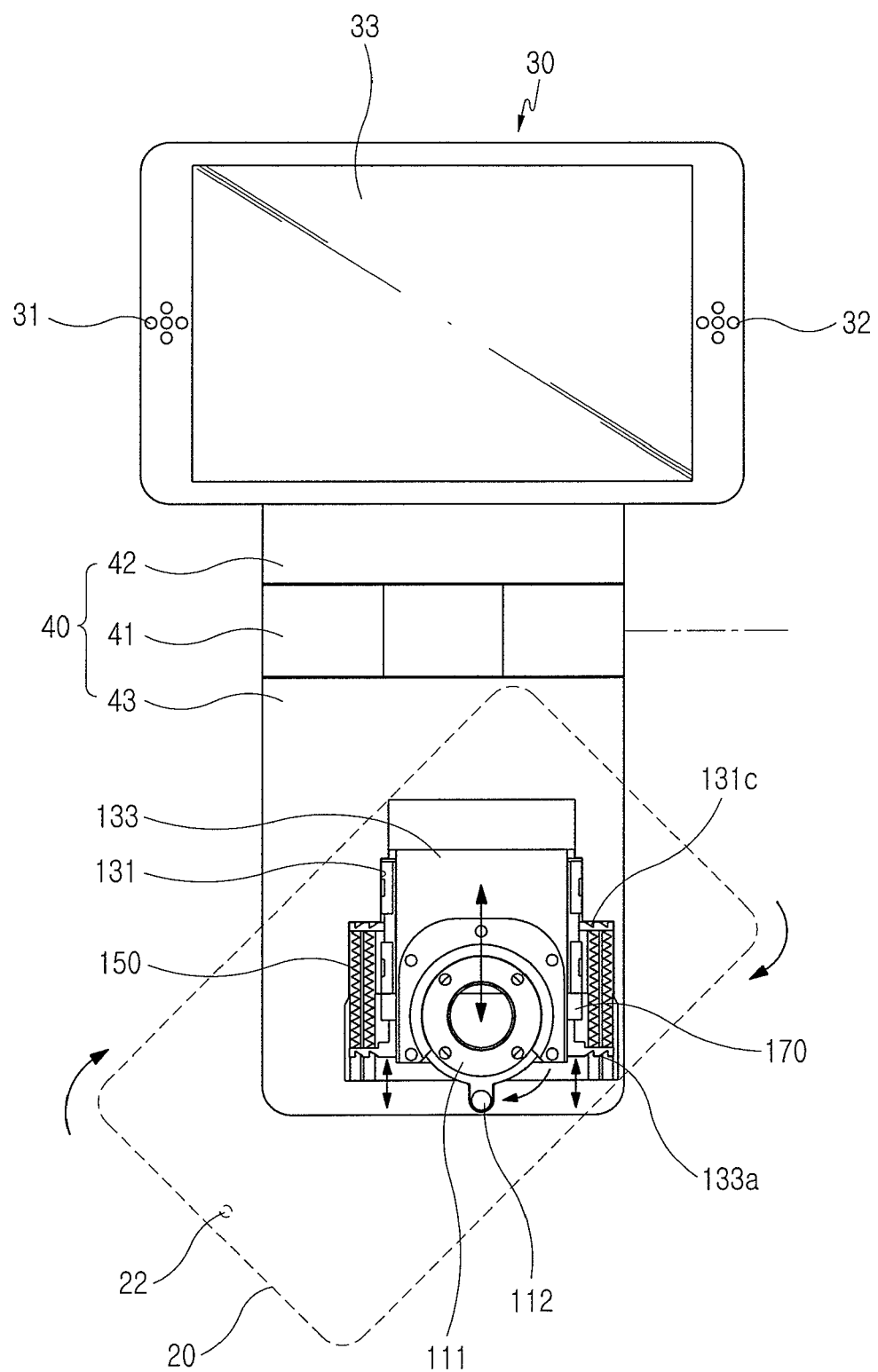
FIG. 12 is a top plan view illustrating a mobile phone having a dual connection member according to an exemplary embodiment of the present invention in the process of rotating the mobile phone about the third hinge axis of the hinge devices.

As illustrated in FIGS. 11 and 12, when the user wants to use the mobile phone in a game mode, the user rotates the first housing 20 about axis A3 from the longitudinal orientation to the transverse orientation so that the user can use both hands in operating the keypad 21 of the first housing 20.

At this time, as the first housing 20 is rotated, the corresponding rotator 111 is also rotated and the guide pin 112 of the rotator 111 is slid along the corresponding guide groove 120.

As the rotator 111 is slid, the corresponding holder 140 and the corresponding guide rail 133 are moved together with the rotator 111.

The guide rail 133 is slid along the guide bars 132 of the guide member 131.

At this time, the guide pin 112 escapes from the first stopper area 121 and enters the second stopper area 122, and the third hinge axis A3 of the rotator 111 is slid from the upper part to the lower part of the first housing 20.

Figure 13:
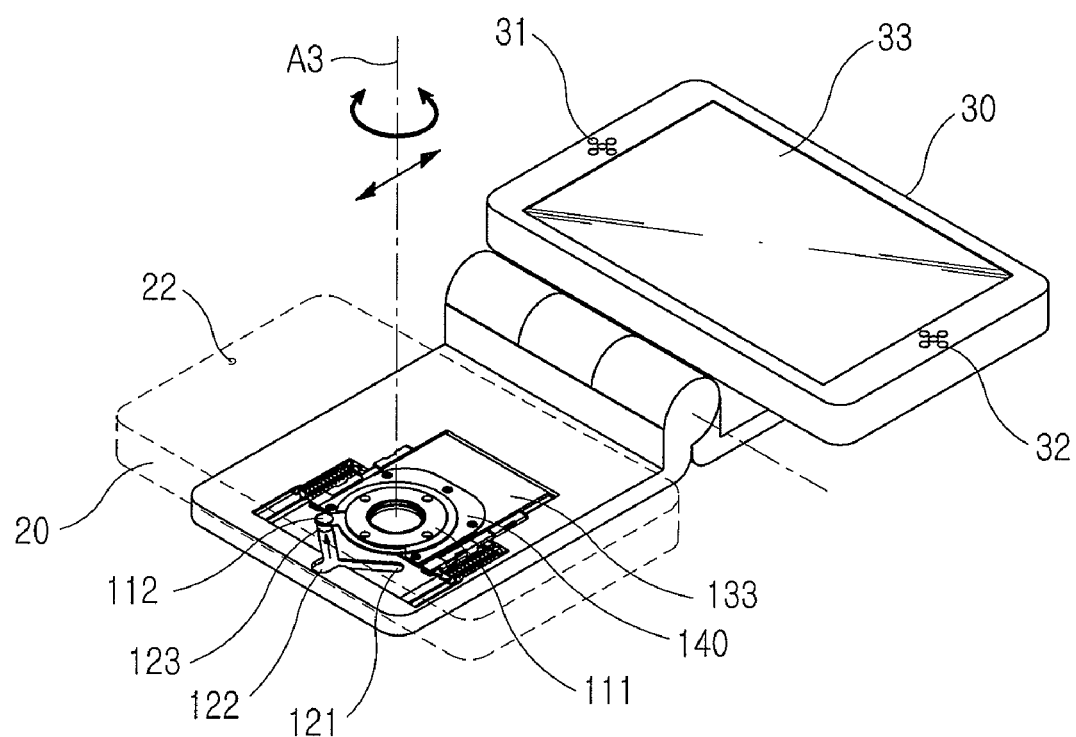
FIG. 13 is a perspective view illustrating a mobile phone having a dual connection member according to an exemplary embodiment of the present invention in a state in which the mobile phone is rotated about the third hinge axis of the hinge devices.

In this state, as illustrated in FIGS. 13 and 14, if the first housing 20 is rotated 90 degrees about the third hinge axis A3 to the transverse orientation, the guide pin 112 escapes from and passes by the second stopper area 122 formed at the center of the guide groove 120, slides along the guide groove 120, and then comes into contact with the third stopper area 123, thereby stopping the sliding movement.

At this time, the third hinge axis A3 of the rotator 111 is slid from the lower part to the upper part of the first housing 20, thereby returning to its original position, and the guide rail 133 is also slid.

At this time, the spring members 150 provided between the guide member 131 and the guide rail 133 cause the guide pin 112 to be rotated and slid along the guide groove 120 by an elastic force.

At this time, the guide rail 133 can be slid by the guide bar 132 of the guide member 131.

The guide rail 133 and the rotator 111 return to their original positions and the guide pin 112 comes into contact with the third stopper area 123.

The guide rail 133 and the rotator 111 are rotated and slid in the up and down directions of the first housing 20.

The first and second housings are positioned in the "T" arrangement.

Figure 15:
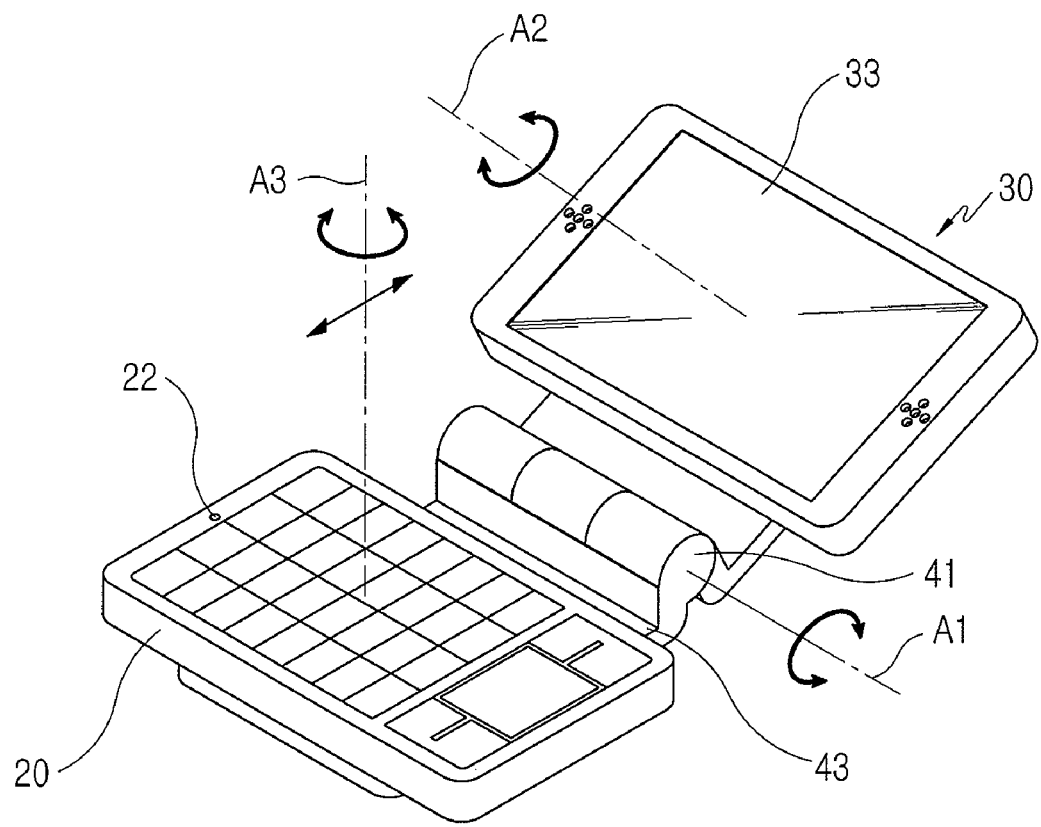
FIG. 15 is a perspective view illustrating a mobile phone having a dual connection member according to an exemplary embodiment of the present invention in a state in which a second housing is rotated 135 degrees about the first hinge axis of the hinge devices.
Figure 16:
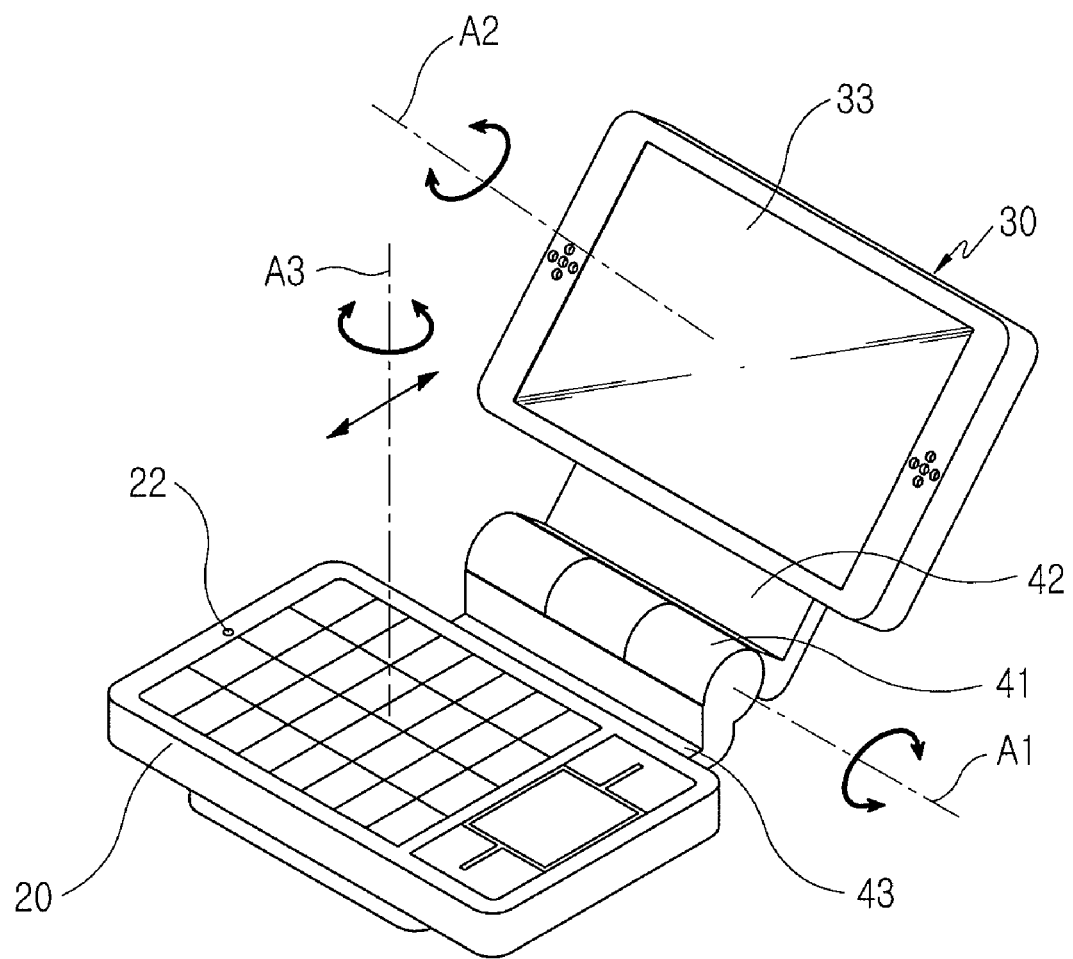
FIG. 16 is a perspective view illustrating a mobile phone having a dual connection member according to an exemplary embodiment of the present invention in a state in which the second housing is rotated 60 degrees about the first hinge axis of the hinge devices.

At this time, as illustrated in FIGS. 15 and 16, the second housing 30 can be rotated 60 degrees or 135 degrees in relation to the first housing 20 depending on the angle desired by the user.

Here, if it is desired to move the first housing 20 from the transverse orientation to the longitudinal orientation, thereby returning the first housing 20 to its original position, the first housing 20 is reversely rotated about the third hinge axis A3. Then, the corresponding rotator 111 and the corresponding guide rail 133 are rotated and slid again and the corresponding guide pin 112 escapes from the second stopper area 123 of the corresponding guide groove 120, enters and escapes from the second stopper area 122, and then comes into the first stopper area 121, thereby stopping the rotation and sliding movement. As a result, the first housing 20 returns to its longitudinal orientation.

The spring members 150 provide an elastic force for allowing the rotator 111 and the guide rail 133 to be rotated and slid.

The guide rail 133 and the rotator 111 are rotated and slid in the up and down directions of the first housing 20.

Now, a hinge device of a mobile phone having a dual connection member configured as described above according to an exemplary embodiment of the present invention will be described in more detail in terms of the operation thereof with reference to FIGS. 17 to 30.

As illustrated in FIGS. 17, 18, 19, 20, 21 and 22, the mobile phone 10 includes first and second housings 20 and 30, and a dual connection member 40.

The dual connection member 40 includes first, second and third connection members 41, 42 and 43.

The second dual connection members 42 and 43 are connected by the first connection member 41 in such a manner as to be rotatable about a first hinge axis A1 in relation to each other.

The second connection member 42 is connected with the second housing 30 in such a manner as to be rotatable about a second hinge axis A2 in relation to each other, wherein the second housing includes first and second speakers 31 and 32 and a large-sized liquid crystal display unit 33.

The third connection member 43 is connected with the first housing 20 in such a manner as to be rotatable about the third hinge axis A3 in relation to each other, wherein the first housing 20 includes a keypad 21 and a microphone 22.

Hinge devices 200 are provided between the first and second housings 20 and 30 and between the second and third connection members 42 and 43, respectively.

Figure 17:
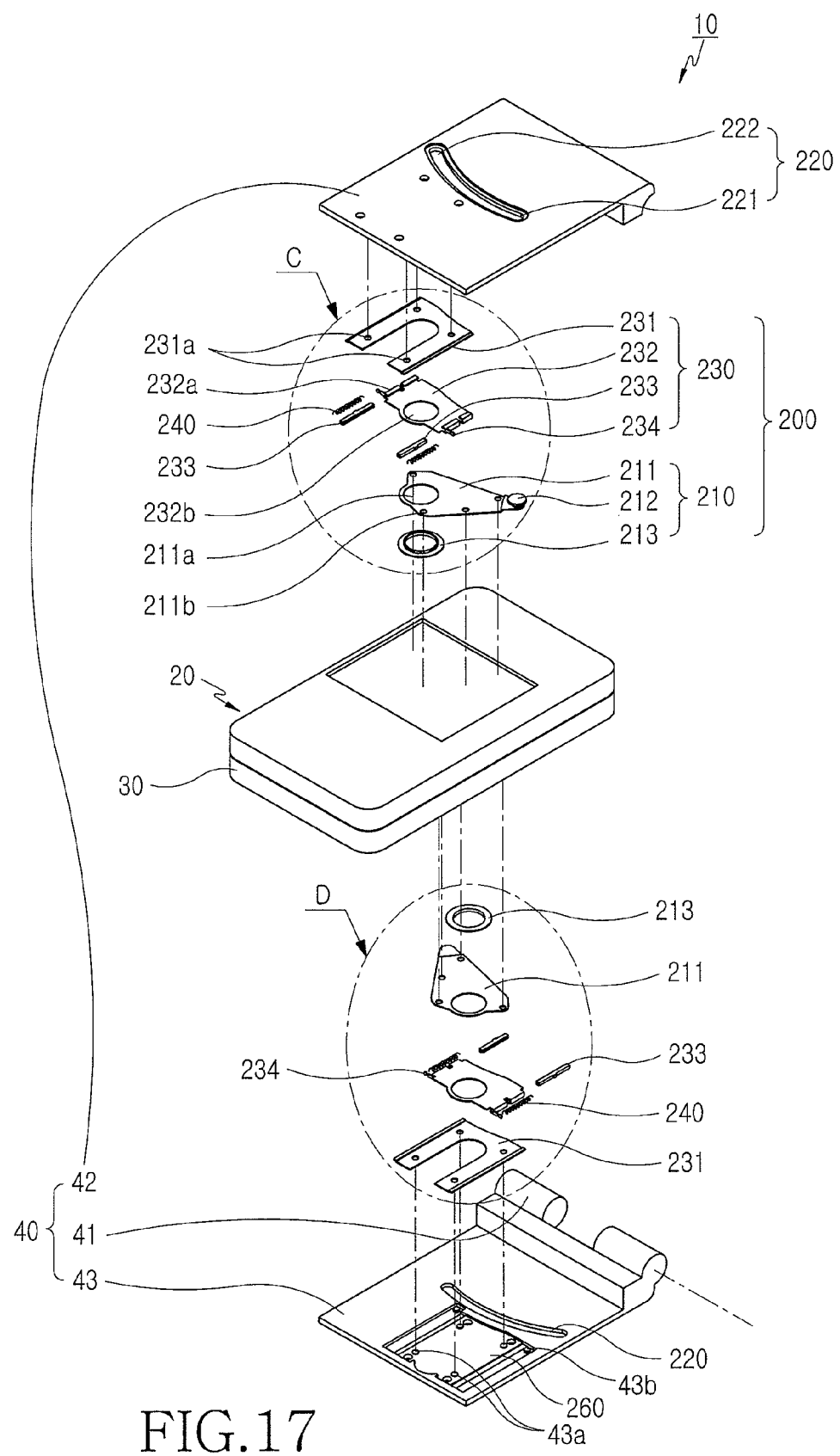
FIG. 17 is an exploded perspective view illustrating a hinge device of a mobile phone having a dual connection member according to an exemplary embodiment of the present invention.
Figure 18:
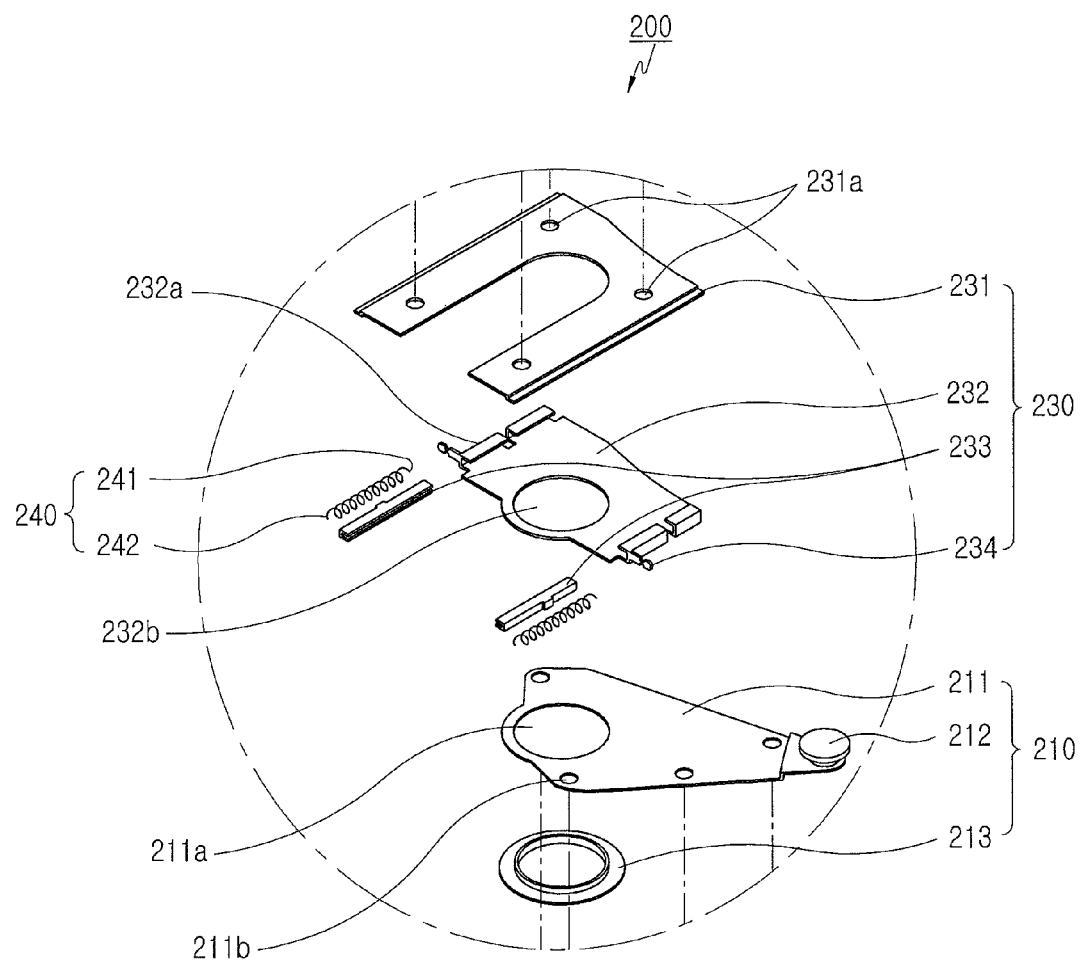
FIG. 18 is an enlarged exploded perspective view of the "C" part in FIG. 17.
Figure 19:
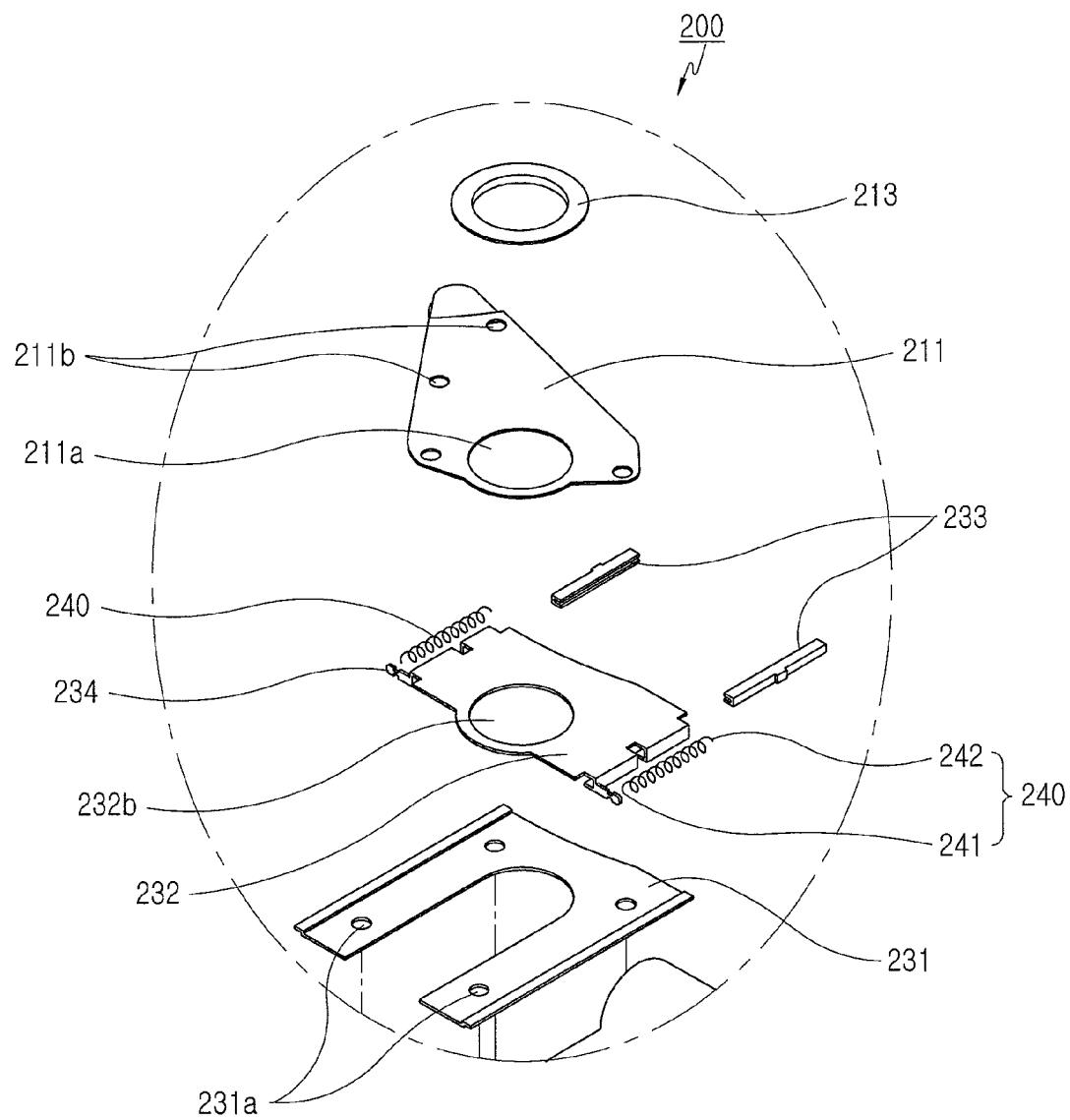
FIG. 19 is an enlarged exploded perspective view of the "D" part in FIG. 17.
Figure 20:
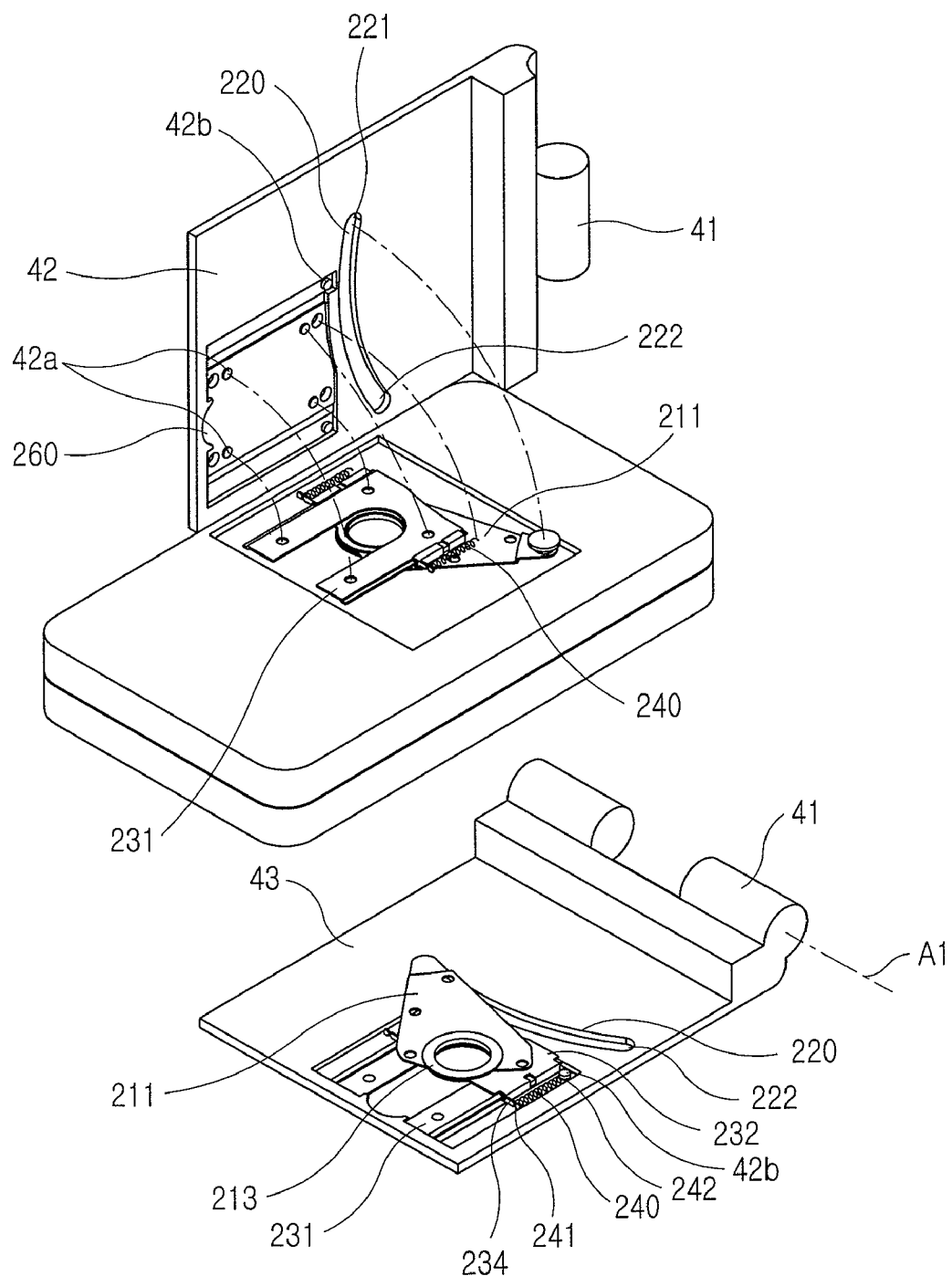
FIG. 20 is an exploded perspective view illustrating a mobile phone having a dual connection member according to an exemplary embodiment of the present invention before the dual connection member is assembled among the components of the hinge device of the mobile phone.

As illustrated in FIGS. 17 to 19, each of the hinge devices 200 includes a rotary member 210, a rotational movement means 220, a guide movement member 230, and an elastic means 240.

The rotary member 210 has a rotator 211 which is rotatably connected with a guide member 232 provided in the guide movement member 230, a through-hole 211a formed through the rotator 211 and a through-hole 232b formed through the guide member 232 are aligned with each other, and a washer 213 is fitted through the through-holes 211a and 232b so as to support the rotation of the rotator 211.

A pair of guide bars 233 are mounted in mounting areas 232a on the opposite sides of the guide member 232, respectively, and a guide rail 231 provided in the guide movement member 230 is slidably engaged with the guide bars 233.

In this state, one or more fastening grooves 231a formed in the guide rail 231 are fitted on one or more projections 42a or 43a formed on a corresponding one of the second and third connection members 42 and 43.

At this time, one or more fastening areas 211b, which are formed in the rotator 211, are fastened to a corresponding one of the first and second housings 20 and 30.

Each of the hinge devices 200 is mounted in a mounting recess 260 formed in the second or third connection member 42 or 43, and the guide pins 212 of each of the rotators 211 are fitted through guide holes 221 of the rotational movement means 220 formed within the mounting recesses 260, respectively.

One end 241 of each spring member 240 is engaged with one of first spring anchoring members 234 projecting from the opposite sides of a corresponding guide member 232, and the other end 242 of each spring member 240 is engaged with one of second spring anchoring members 42b or 43b anchored to the second and third connection members 42 and 43, respectively.

Figure 21:
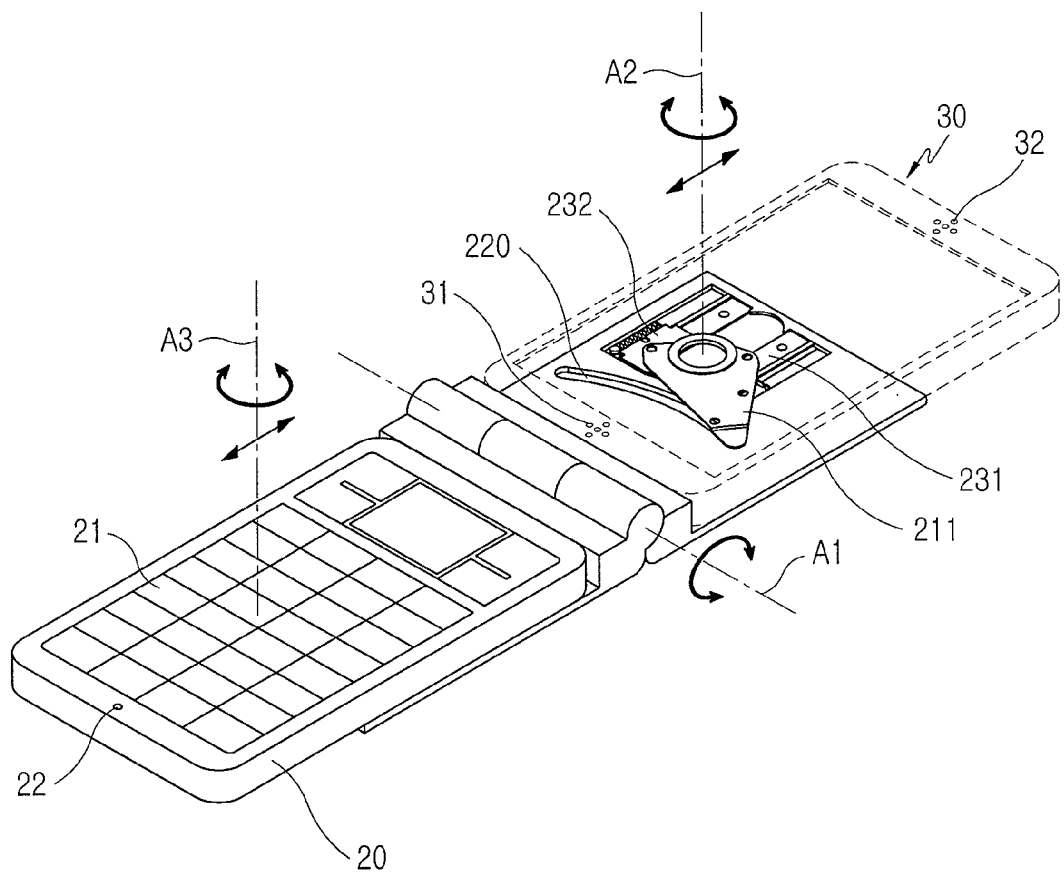
FIG. 21 is a perspective view illustrating a mobile phone having a dual connection member according to an exemplary embodiment of the present invention in a state in which the mobile phone is rotated about a first hinge axis of the hinge device.
Figure 22:
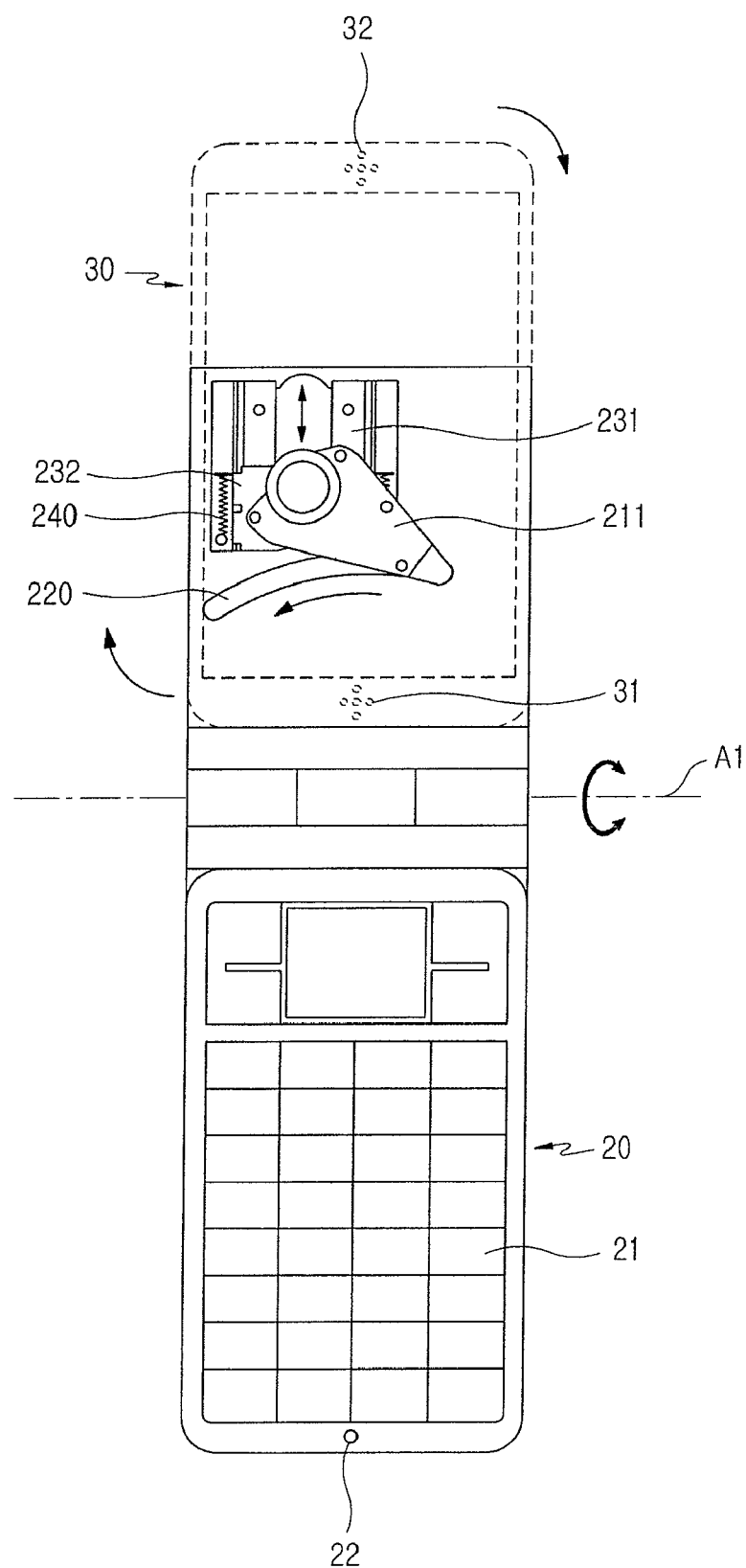
FIG. 22 is a top plan view illustrating a mobile phone having a dual connection member according to an exemplary embodiment of the present invention in a state in which the mobile phone is rotated about the first hinge axis of the hinge device.

In this state, if the user wants to use the mobile phone in a communication mode, the second housing 20 is rotated about the first hinge axis A1 of the first connection member 41 away from the first housing 20 as illustrated in FIGS. 21 and 22. Then, the first and second housings 20 and 30 are longitudinally orientated.

Figure 23:
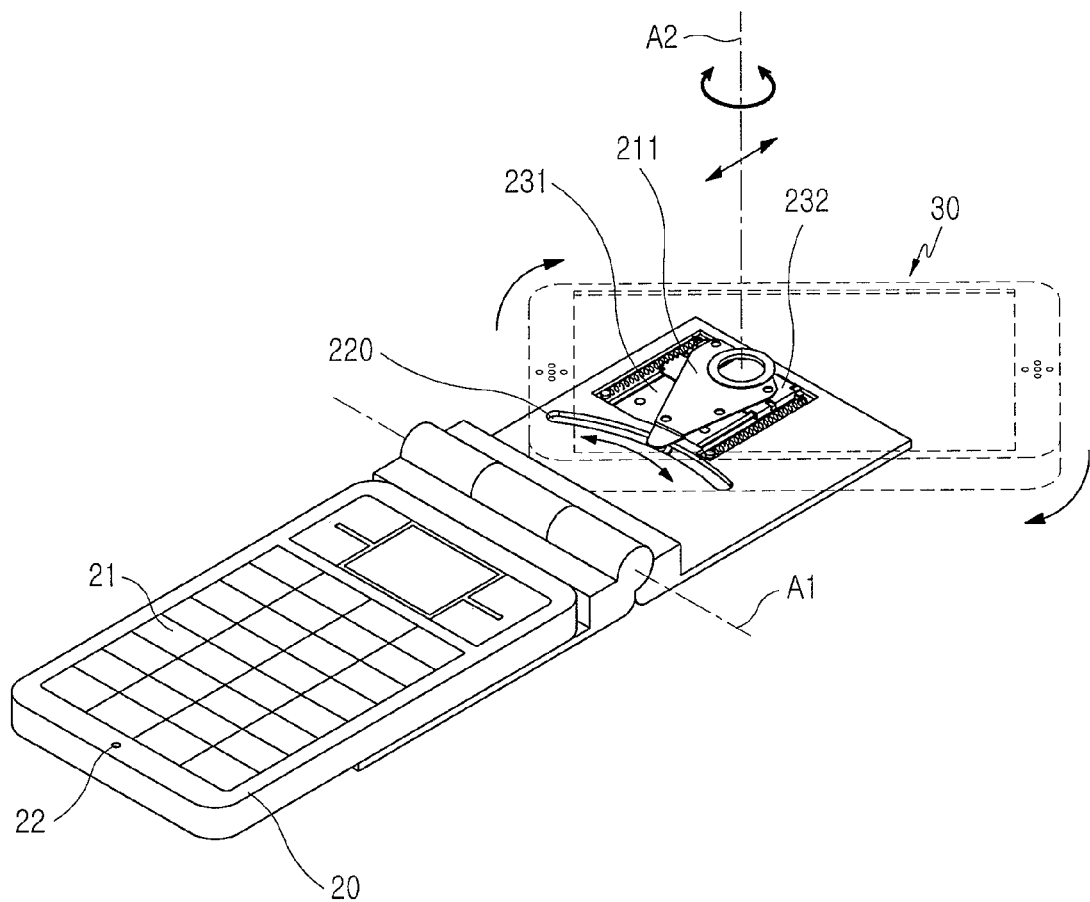
FIG. 23 is a perspective view illustrating a mobile phone having a dual connection member according to an exemplary embodiment of the present invention in the process of rotating the mobile phone about a second hinge axis of the hinge device.
Figure 24:
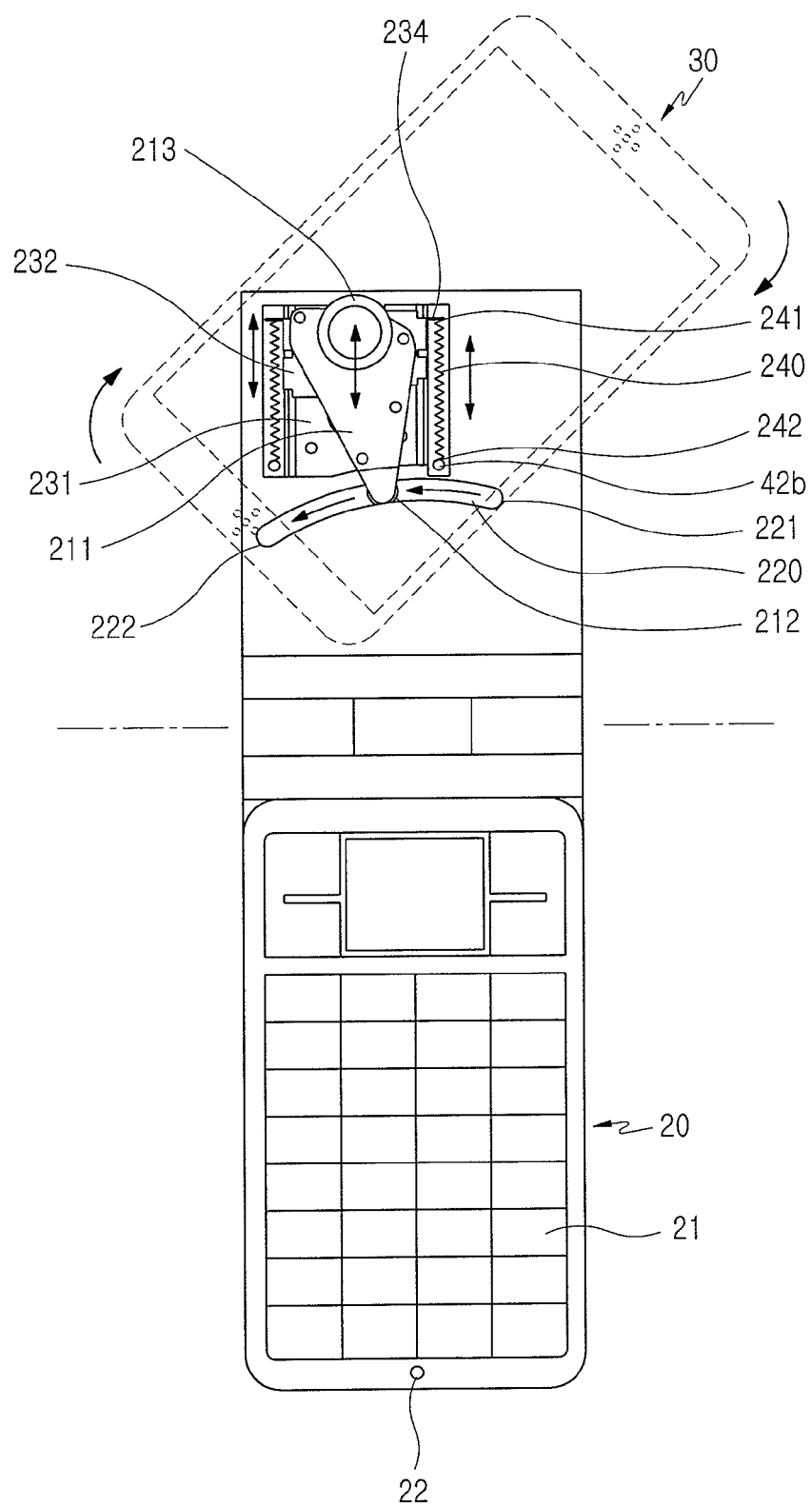
FIG. 24 is a top plan view illustrating a mobile phone having a dual connection member according to an exemplary embodiment of the present invention in the process of rotating the mobile phone about the second hinge axis of the hinge device.

Then, as illustrated in FIGS. 23 and 24, if the user wants to watch TV or moving images through a large-sized liquid crystal display unit 33, the user rotates the second housing 30 about the second hinge axis A2 from the longitudinal orientation to the transverse orientation.

As the second housing 30 is rotated, the corresponding rotator 211 is also rotated, and the guide pin 212 of the rotator 211 is rotated in a predetermined trace along the corresponding rotary hole 220.

The rotator 211 is slid as well as being rotated in the predetermined trace, and the guide member 232 is also slid.

The guide member 232 is slid along the corresponding guide rail 231.

A pair of guide bars 233 are provided at the opposite sides of the guide member 232, respectively. Therefore, the guide bars 233 are also moved along the guide rail 231 when the guide member 232 is slid.

Figure 25:
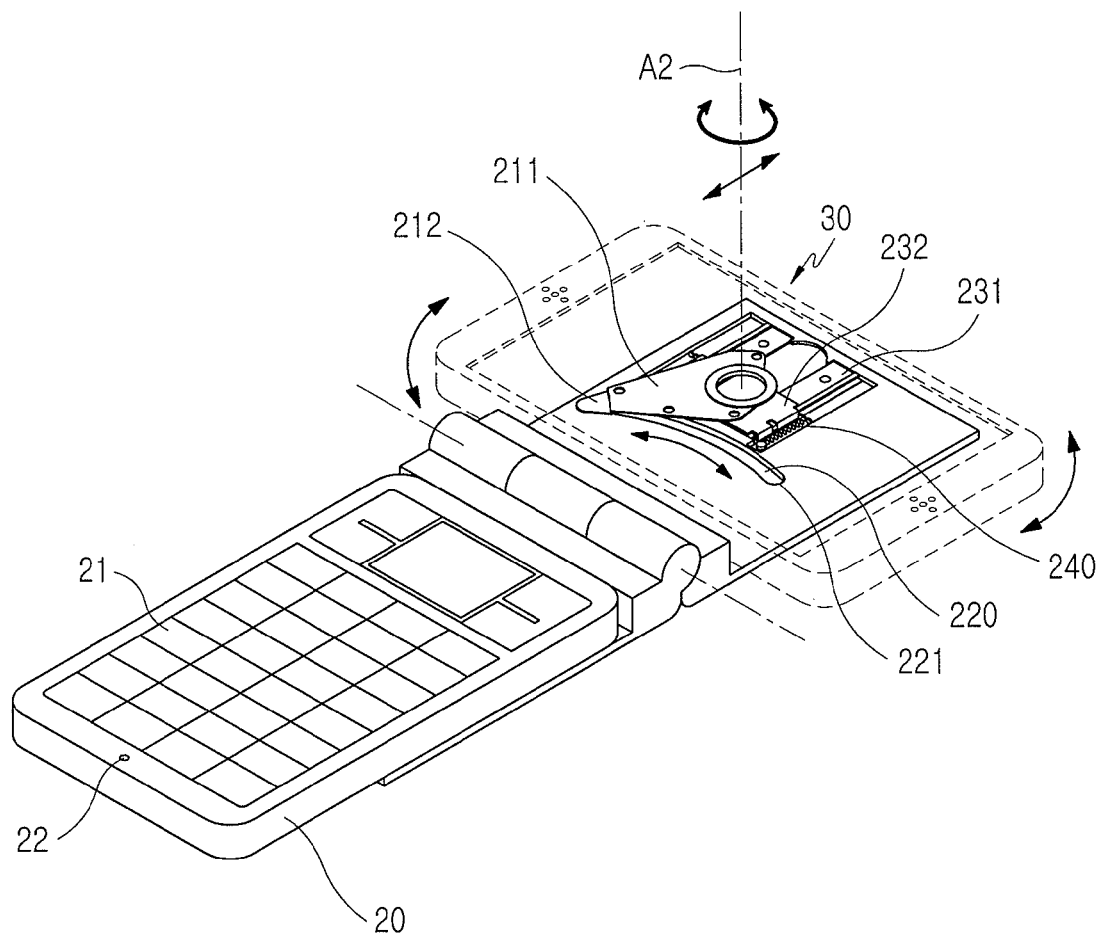
FIG. 25 is a perspective view illustrating a mobile phone having a dual connection member according to an exemplary embodiment of the present invention in a state in which the mobile phone is rotated about the second hinge axis of the hinge device.
Figure 26:
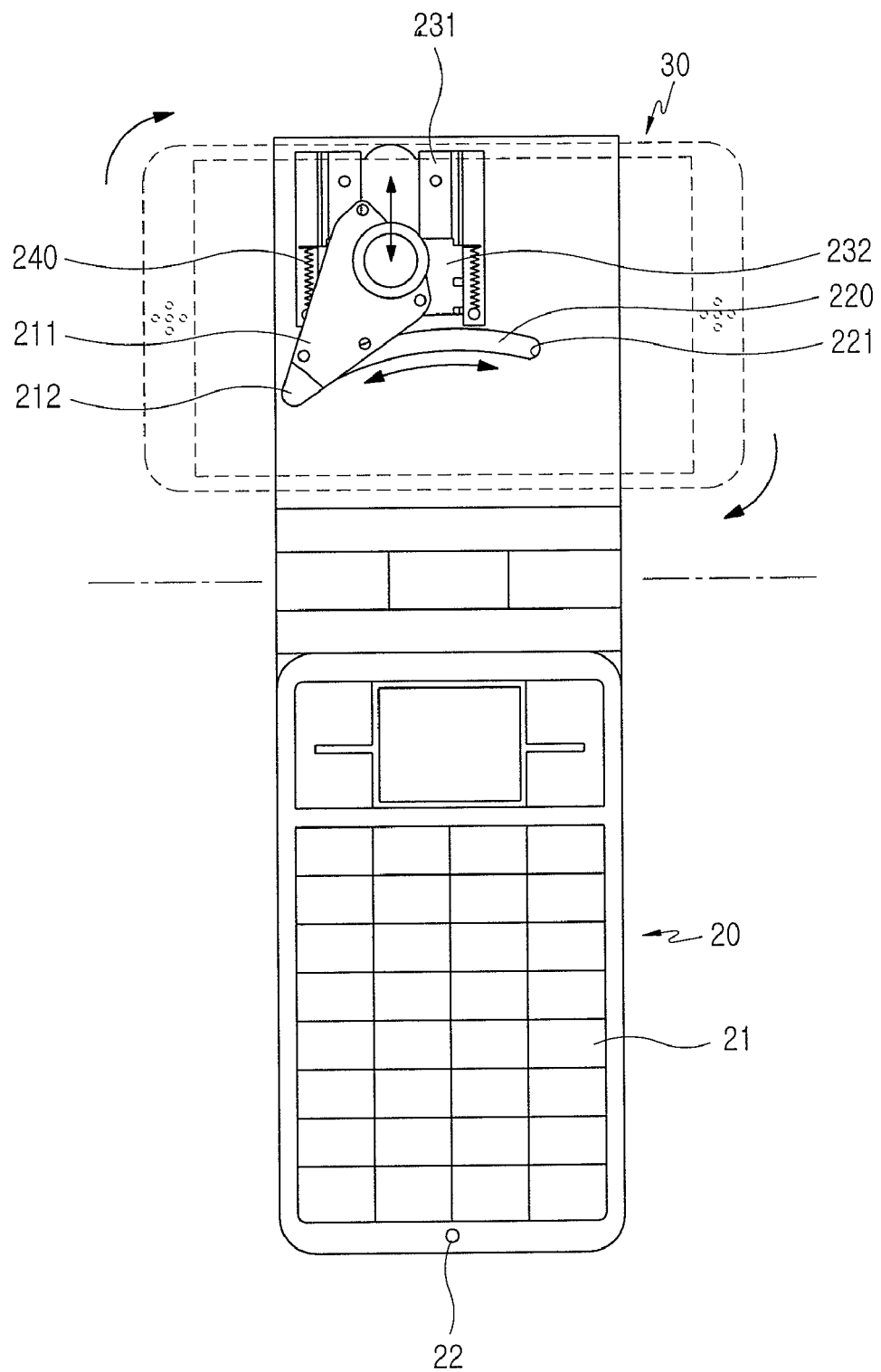
FIG. 26 is a top plan view illustrating a mobile phone having a dual connection member according to an exemplary embodiment of the present invention in a state in which the mobile phone is rotated about the second hinge axis of the hinge device.
Figure 27:
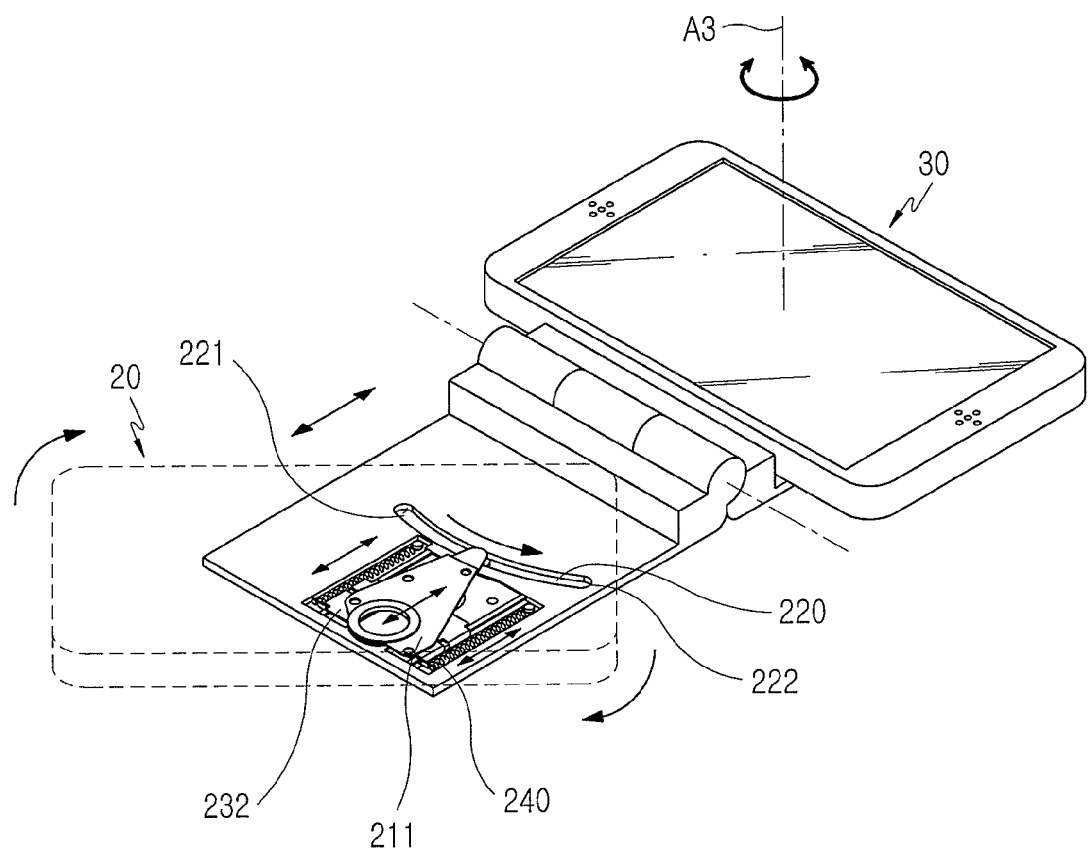
FIG. 27 is a perspective view illustrating a mobile phone having a dual connection member according to an exemplary embodiment of the present invention in the process of rotating the mobile phone about a third hinge axis of the hinge device.
Figure 28:
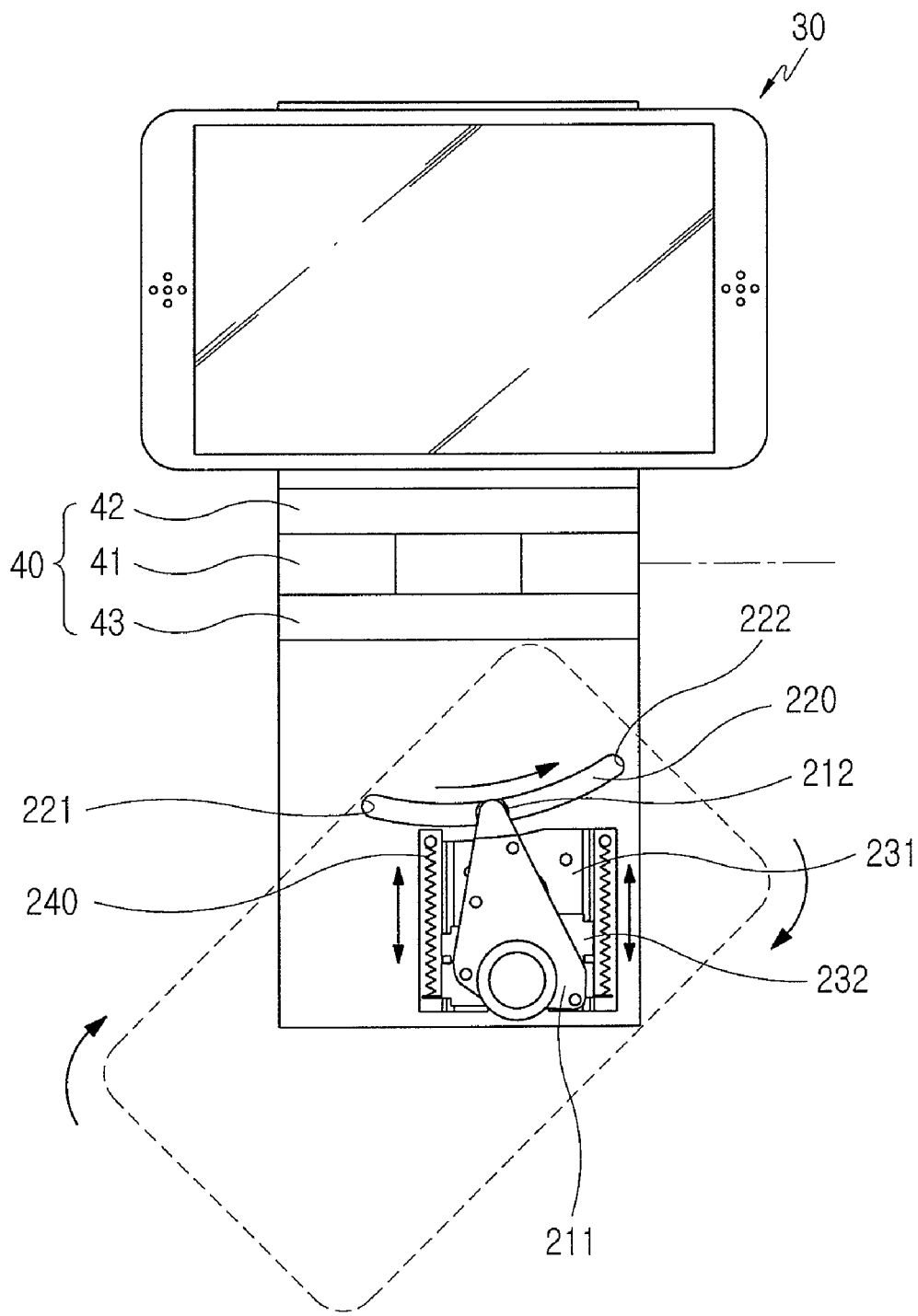
FIG. 28 is a top plan view illustrating a mobile phone having a dual connection member according to an exemplary embodiment of the present invention in the process of rotating the mobile phone about the third hinge axis of the hinge device.
Figure 29:
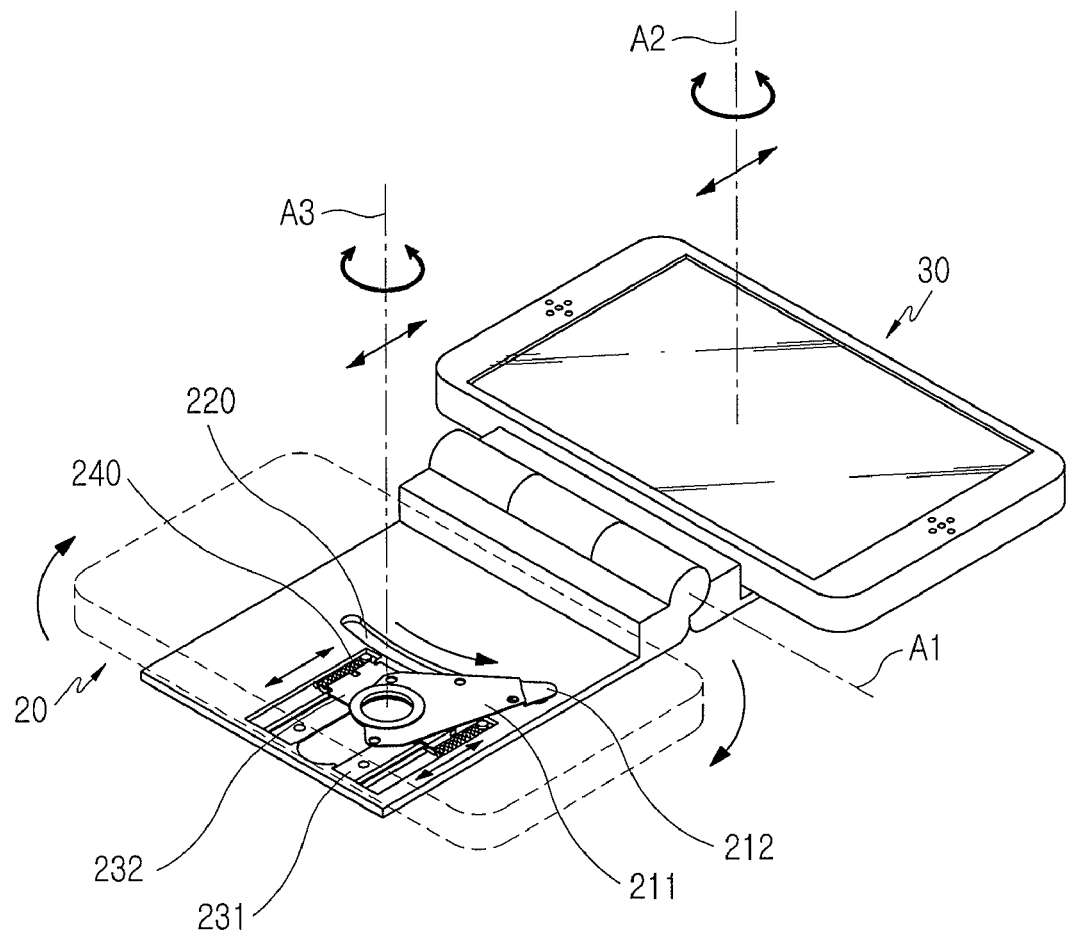
FIG. 29 is a perspective view illustrating a mobile phone having a dual connection member according to an exemplary embodiment of the present invention in a state in which the mobile phone is rotated about the third hinge axis of the hinge device.

At this time, as illustrated in FIGS. 25 and 26, the second hinge axis A2 of the rotator 211 is slid from the lower part to the upper part of the second housing 30. At this time, if the guide pin 212 is positioned at the center of the rotary hole 220 and rotated in the predetermined trace and the second housing 30 is rotated about 90 degrees about the second hinge axis A2 from the longitudinal orientation to the transverse orientation, the guide pin 212 escapes from the first stopper area 221 formed in the rotary hole 220, rotates in the predetermined trace along the rotary hole 220, and then comes into contact with the second stopper area 222, thereby stopping the rotational movement.

The second hinge axis A2 of the rotator 211 is slid from the upper part to the lower part of the second housing 30, and the guide member 232 returns to its original position.

The rotator 211 and the guide member 232 are rotated and slid in upward and downward directions of the second housing 30.

As illustrated in FIG. 26, the first and second housings 20 and 30 are positioned in a "T" arrangement.

Here, if the second housing 30 is reversely rotated about the second hinge axis A2 in order to return the second housing 30 to its original position from the transverse orientation to the longitudinal orientation, the rotator 211 and the guide member 232 are rotated and slid again, and the guide pin 212 escapes from the second stopper area 222 of the rotary hole 220 and comes into contact with the first stopper area 221, thereby stopping the rotational and sliding movements. Then, the second housing 30 returns to its original position from the transverse orientation to the longitudinal orientation.

The spring members 240 provide an elastic force for allowing the rotator 211 and the guide member 232 to be rotated and slid.

Here, if the user wants to use the mobile phone 10 in a game mode function for example, the user rotates the first housing 20 from the longitudinal orientation to the transverse orientation about the third hinge axis A3 in order to operate the keypad 21 on the first housing 20 by using both hands.

As the first housing 20 is rotated, the corresponding rotator 211 is rotated together with the first housing 20, and the guide pin 212 of the rotator 211 is rotated from the upper part to the lower part of the first housing along the predetermined trace of the corresponding rotary hole 220.

Simultaneously with the rotation of the rotator 211, the corresponding guide member 232 is slid.

The guide member 232 is slid along the corresponding guide rail 231.

At this time, the guide pin 212 escapes from the first stopper area 221 of the rotary hole 220 and is then positioned at the center of the rotary hole 220.

As illustrated in FIGS. 27, 28, 29 and 30, if the first housing 20 is rotated about 90 degrees, the guide pin 212 is also rotated along the predetermined trace of the rotary hole 220 and comes into contact with the second stopper area 222, thereby stopping the sliding movement.

At this time, the third hinge axis A3 of the rotator 211 is slid from the upper part to the lower part of the first housing and returns to its original position, the rotator 211 is slid while being rotated, and the guide member 232 is also slid.

At this time, the guide pin 212 is rotated and slid along the rotary hole 220 by the elastic force of the spring members 240 provided in the guide member 232.

The guide member 232 and the rotator 211 return to their original positions again, and the guide pin 212 comes into contact with the second stopper area 222.

The rotator 211 and the guide member 232 are rotated and slid in the up and down directions of the second housing 30.

Figure 30:
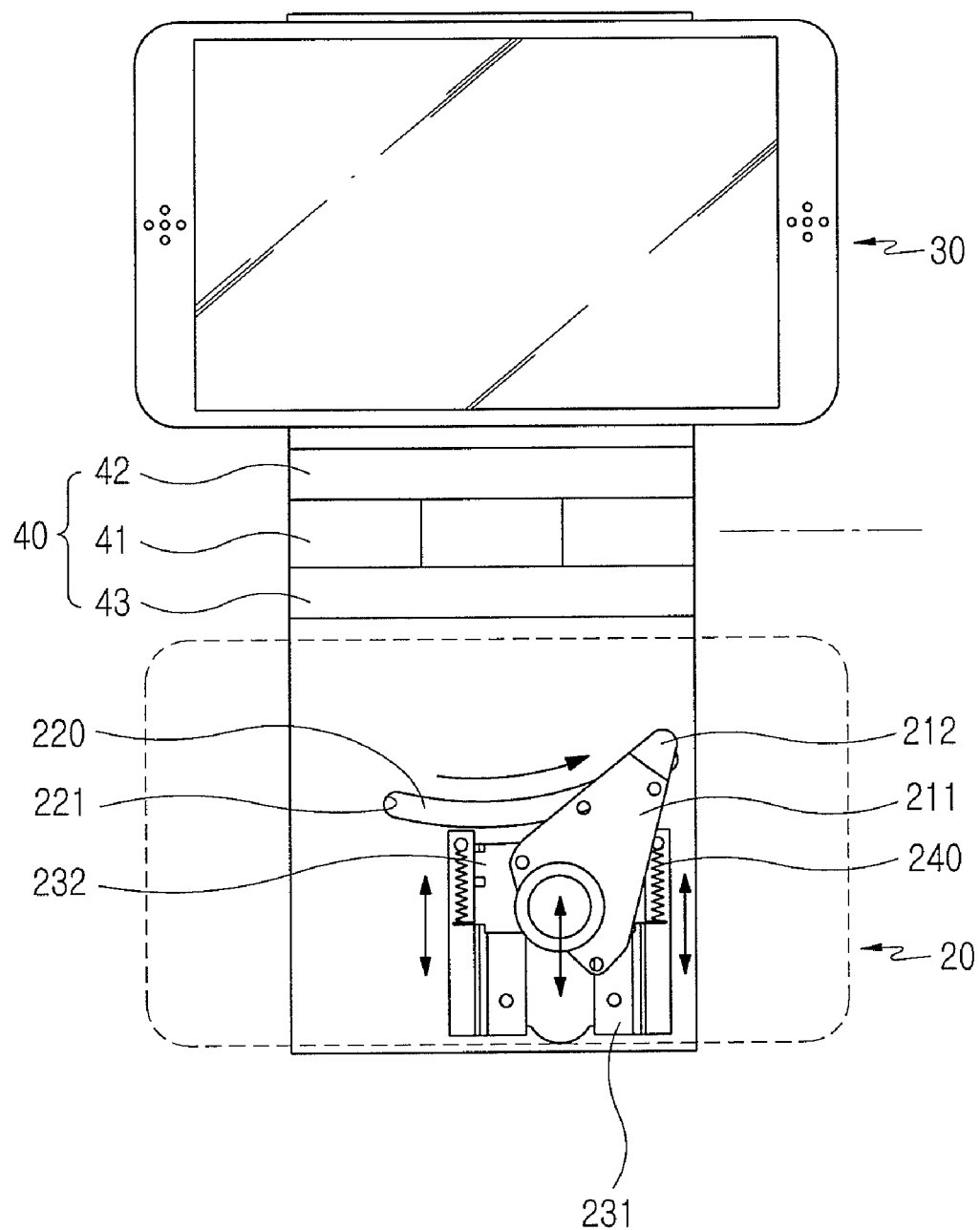
FIG. 30 is a top plan view illustrating a mobile phone having a dual connection member according to an exemplary embodiment of the present invention in a state in which the mobile phone is rotated about the third hinge axis of the hinge device.

As illustrated in FIG. 30, the first and second housings are positioned in the "T" arrangement.

Here, if the first housing 20 is reversely rotated about the third hinge axis A3 from the transverse orientation to the longitudinal orientation to its original position again, the corresponding rotator 211 and the corresponding guide member 232 are rotated and slid again and the guide pin 212 escapes from the second stopper area 222 of the rotary hole 220, rotates along the predetermined trace, and comes into contact with the first stopper area 221, thereby stopping the rotational movement. The first housing 20 returns to its original position in the longitudinal orientation.

The spring members 240 provide an elastic force for allowing the rotator 211 and the guide member 232 to be rotated and slid.

By configuring a dual connection member for allowing the liquid crystal display unit and the keypad of a mobile phone to be rotated depending on the mode of using the mobile phone as described above, it is possible to improve convenience in using the mobile phone because the liquid crystal display unit and the keypad can be selectively rotated as desired.

Now, a hinge device of a mobile phone having a dual connection member according to an exemplary embodiment of the present invention configured as described above will be described in more detail in terms of the process of moving the hinge device of the mobile phone with reference to FIGS. 31 to 44.

Figure 31:
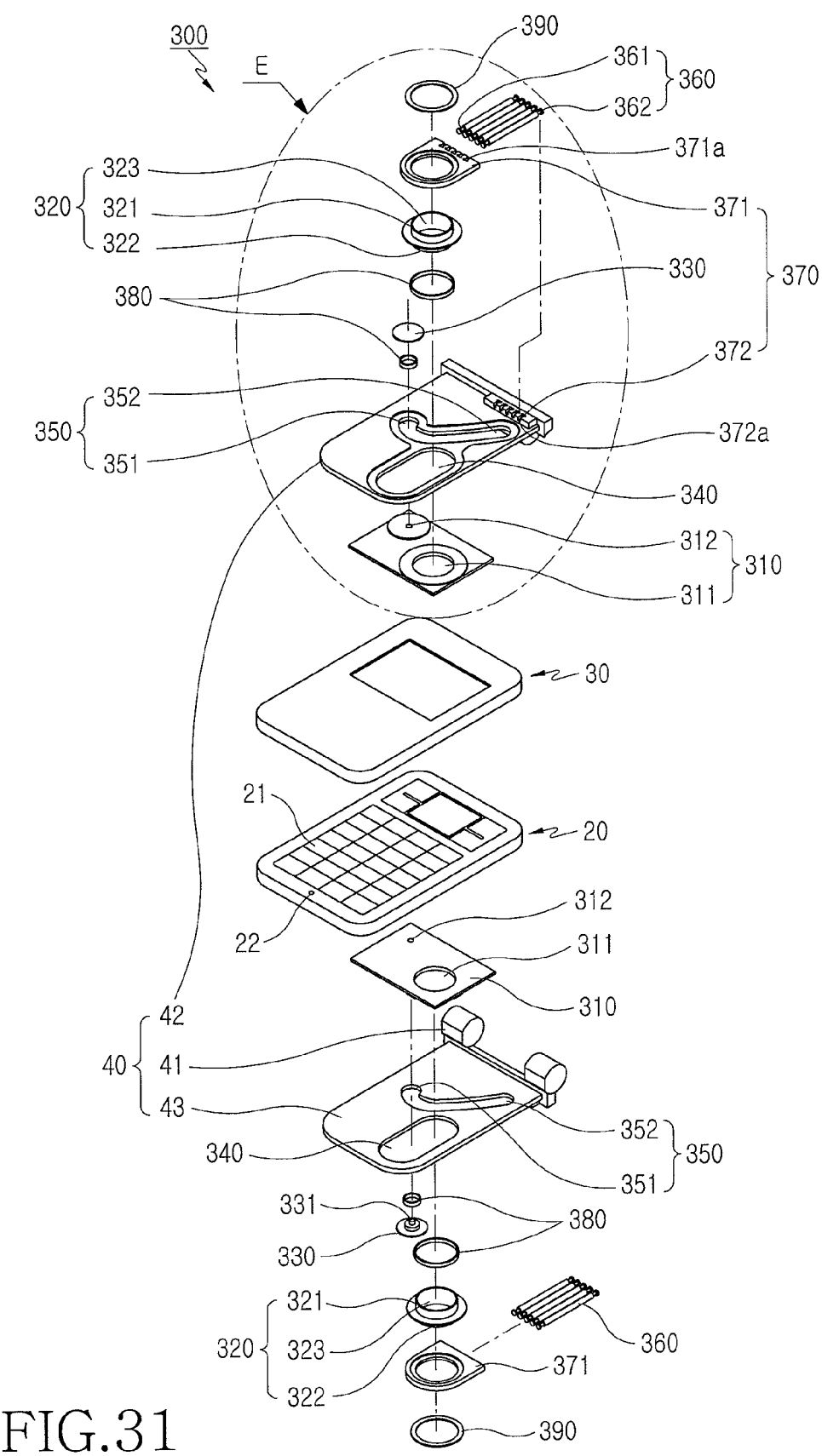
FIG. 31 is an exploded perspective view illustrating a construction of a hinge device of a mobile phone having a dual connection member according to an exemplary embodiment of the present invention.
Figure 32:
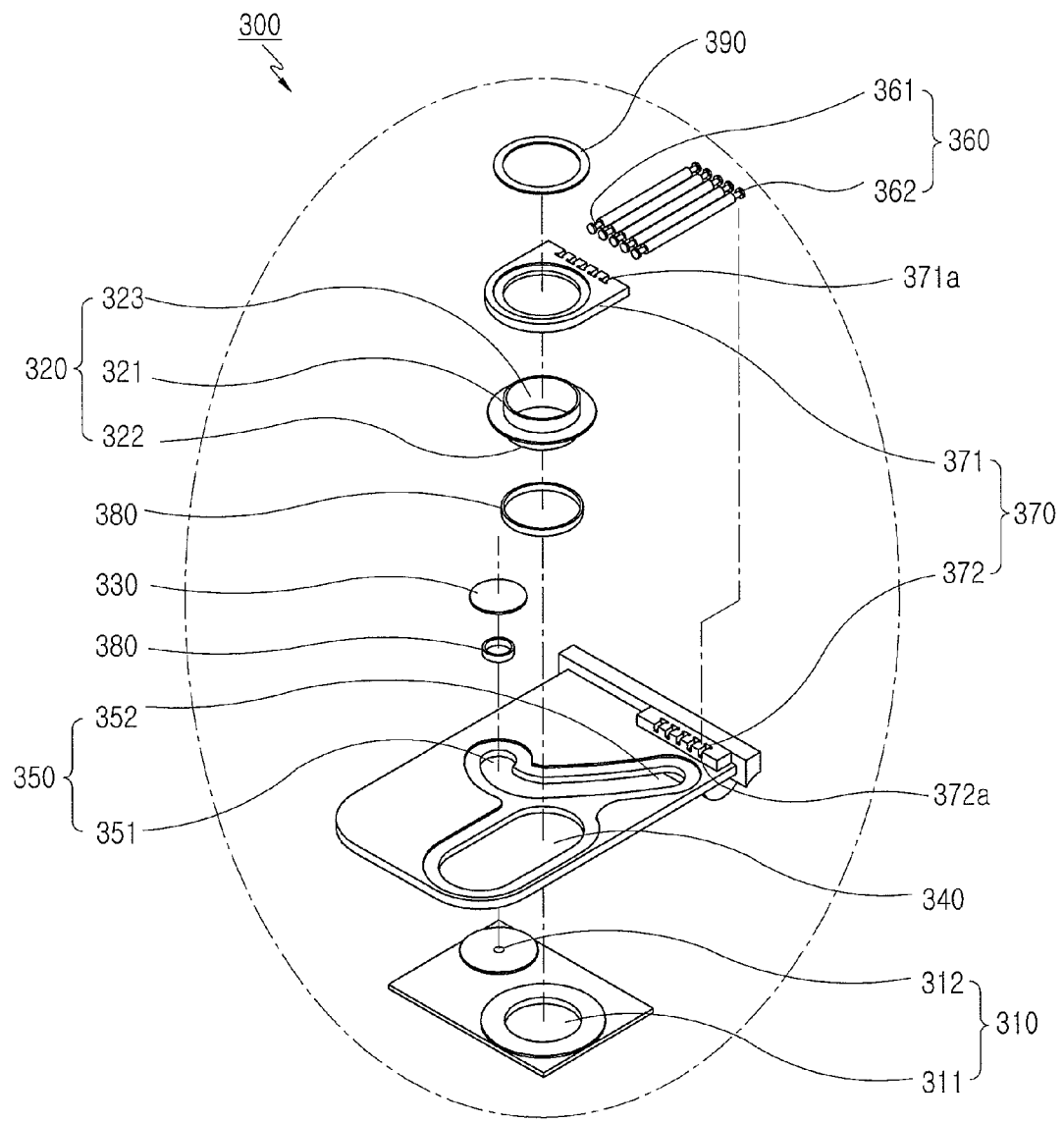
FIG. 32 is an enlarged exploded perspective view of the "E" part of FIG. 31.
Figure 33:
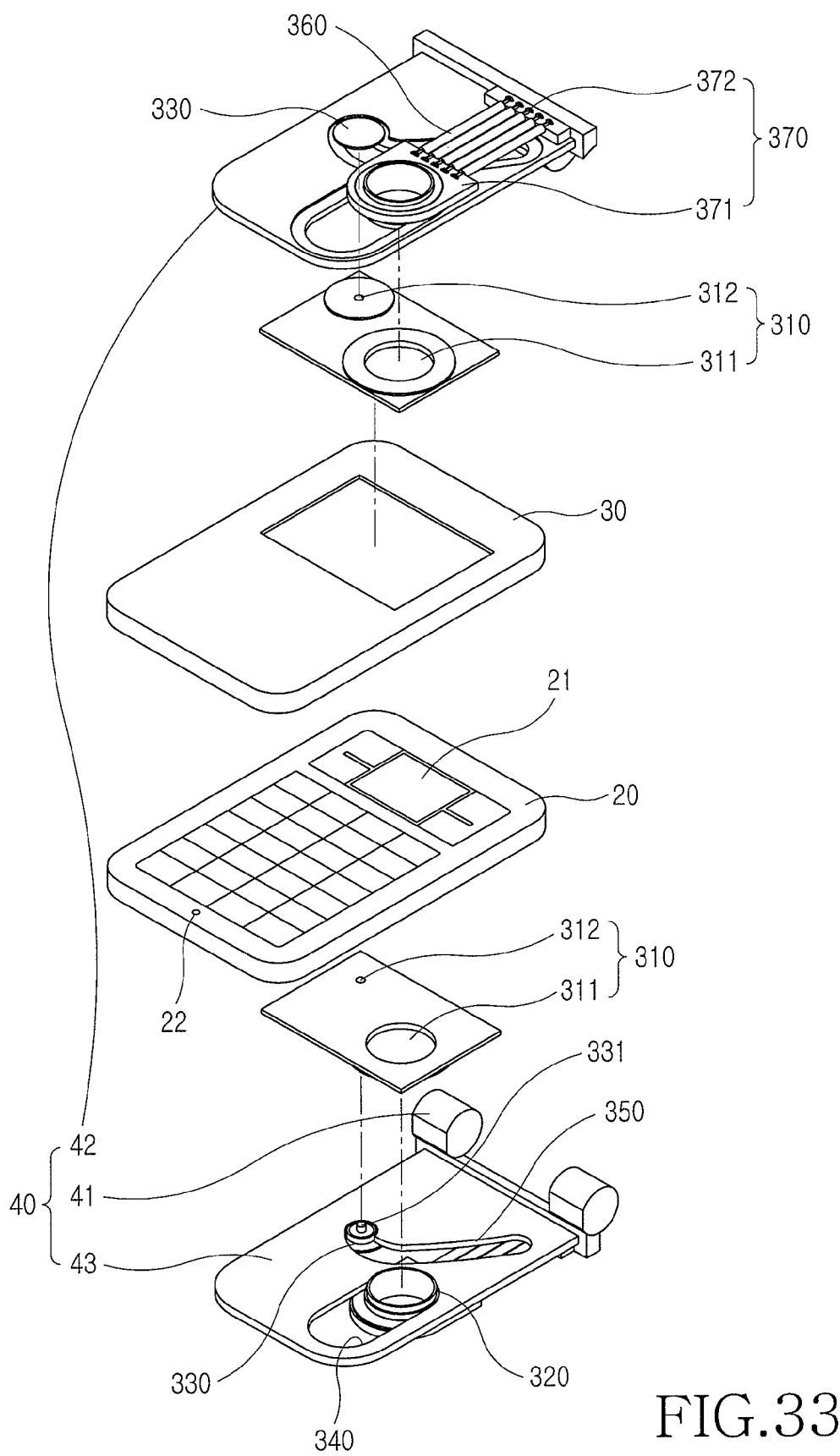
FIG. 33 is an exploded perspective view of a mobile phone having a dual connection member according to an exemplary embodiment of the present invention before the dual connection member is assembled among the components of the hinge device of the mobile phone.

As illustrated in FIGS. 31 to 33, a mobile phone 10 includes first and second housings 20 and 30, and a dual connection member 40. The dual connection member 40 includes first, second and third connection members 41, 42 and 43. The second and third connection members 42 and 43 are connected with each other to be rotatable about a first hinge axis A1 by the first hinge member 41.

The second connection member 42 is connected to the second housing 30 to be rotatable about a second hinge axis A2, wherein the second housing has first and second speaker devices 31 and 32, and a large-sized liquid crystal display unit 33.

The third connection member 43 is connected to the first housing to be rotatable about a third hinge axis A3, wherein the first housing 20 has a keypad 21 and a microphone 22.

Each of the first and second housings 20 and 30 and the second and third connection members 42 and 43 is provided with a hinge device 300.

As illustrated in FIGS. 31 to 44, the hinge device 300 includes link members 310, first and second rotary members 320 and 330, first and second guide portions 340 and 350, elastic members 360, and elastic connection members 370. The link members 310 are mounted in mounting slots formed in the first and second housings 20 and 30, respectively. On the top ends of the link members 310, the second and third connection members 42 and 43 are arranged to be opposite to each other.

From this state, the first and second rotary members 320 and 330 are assembled to each other through first and second guide portions 340 and 350 formed in the second and third connection members 42 and 43, as illustrated in FIGS. 31 and 32. At this time, the first rotary members 320 pass through the first guide portions 340 and rotatably engaged in first rotary holes 311 formed in the link members 310, respectively.

The second rotary members 330 pass through the second guide portions 350 and rotatably engage in the second rotary holes 312 formed in the link members 310.

Between the first and second rotary members 320 and 330 and the first and second guide portions 340 and 350, guide rollers 380 are interposed so as to guide the first and second rotary members 320 and 330 rectilinearly or curvilinearly when the first and second rotary members 320 and 330 rotate.

The second rotary members 330 are formed with a rotary projection 331, which is adapted to be engaged in a second rotary hole 312, which is formed in each of the link members 310.

A first joint member 321 formed on the top side of each of the first rotary members 320 is fitted through a joint connection member 371 in one of the elastic connection members 370.

A second joint member 322 formed on the bottom side of each of the first rotary members 320 is inserted into a corresponding one of the first guide portions 340 so that the second joint member 322 can be linearly guided by the corresponding first guide portion 340.

As illustrated in FIGS. 32 and 33, the first and second guide portions 340 and 350 are formed by guide holes, so that the first and second rotary members 320 and 340 can be inserted into and rectilinearly or curvilinearly guided by the first and second guide portions 340 and 350. In this state, one end 361 of each elastic member 360 is engaged with an engagement part 371a formed on a corresponding joint connection member 371 of a corresponding elastic connection member 370, and the other end 362 is engaged with an engagement part 372a formed on a corresponding joint connection member 372 of the corresponding elastic connection member 370. In this state, an O-ring 390 is engaged with the top side of each of the first joint connection members 371 so as to prevent the break-away of a corresponding elastic connection member 370.

The hinge devices 300 are provided on the first and second connection members 42 and 43, respectively.

At the central areas of the first rotary members 320, there are provided soft circuit holes 323 so as to electrically interconnect the first and second housings 20 and 30.

Figure 34:
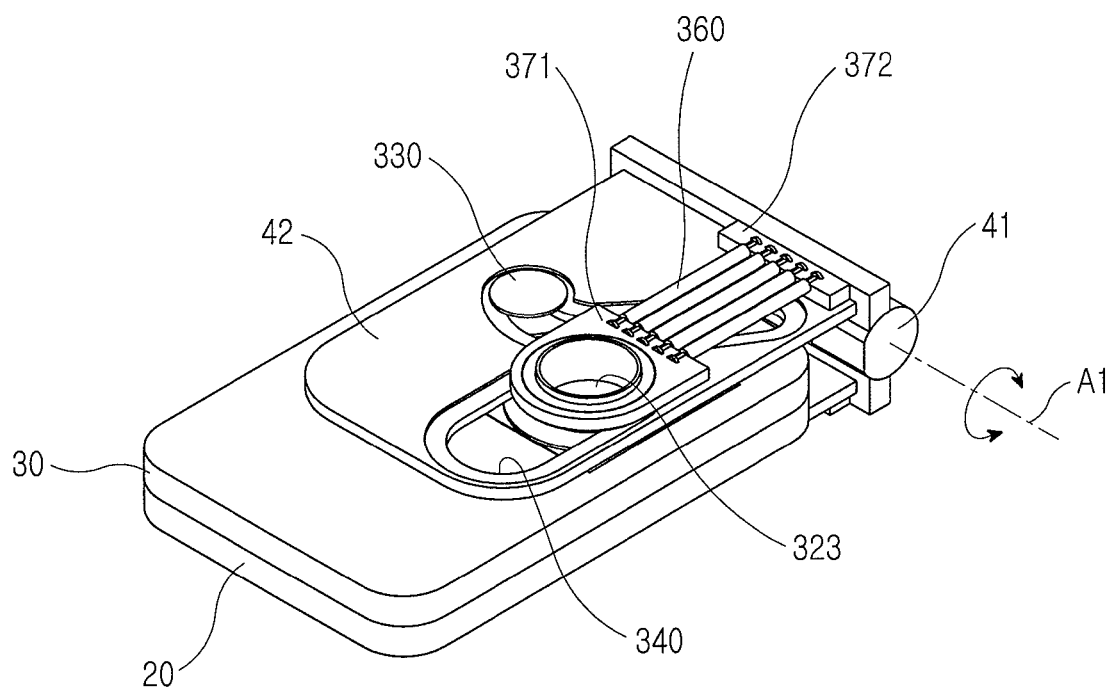
FIG. 34 is a perspective view of a mobile phone having a dual connection member according to an exemplary embodiment of the present invention after the dual connection member is assembled among the components of the hinge device of the mobile phone.
Figure 35:
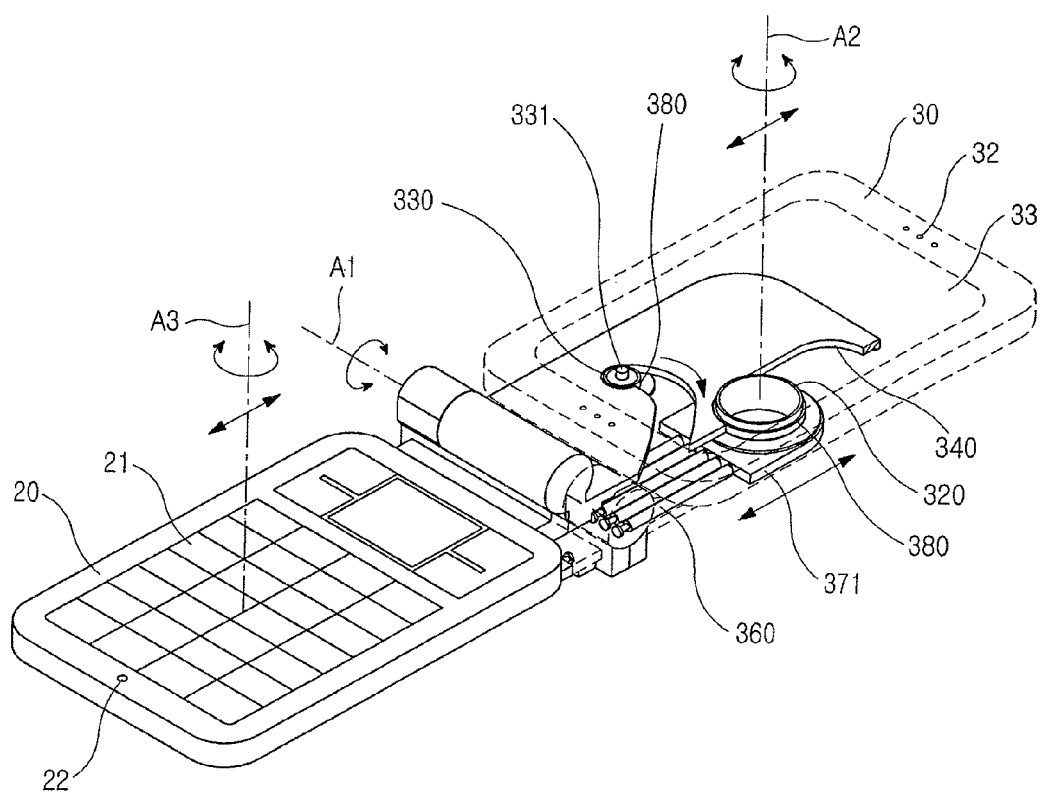
FIG. 35 is a perspective view illustrating a mobile phone having a dual connection member according to an exemplary embodiment of the present invention in a state in which the mobile phone is rotated about a first hinge axis of the hinge device.
Figure 36:
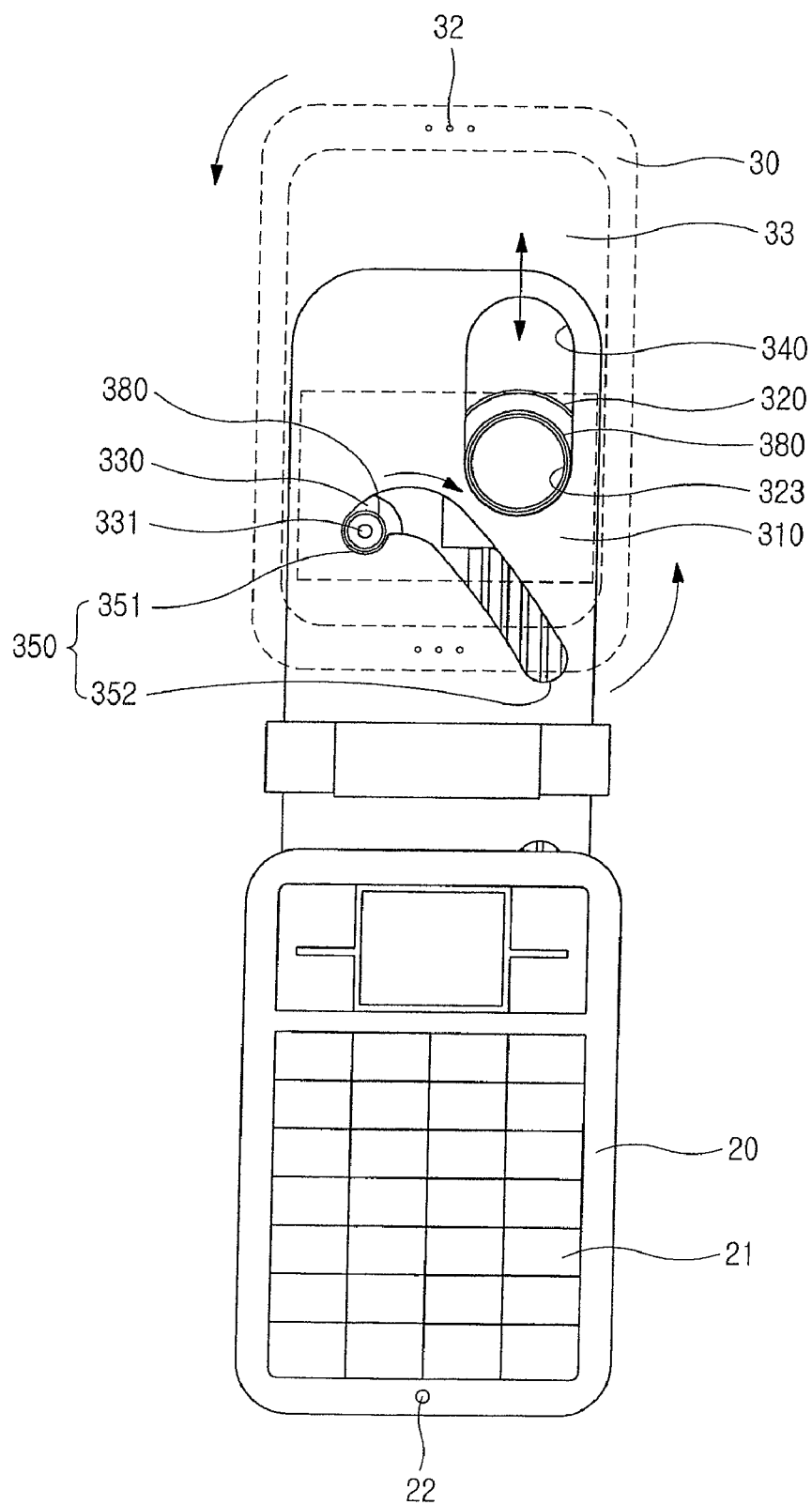
FIG. 36 is a top plan view illustrating a mobile phone having a dual connection member according to an exemplary embodiment of the present invention in a state in which the mobile phone is rotated about the first hinge axis of the hinge device.

In this state, as illustrated in FIGS. 34 to 36, if the user wishes to use the mobile phone in the communication mode, the second housing 30 is rotated about the first hinge axis A1 of the first connection member 41 so that the second housing 30 is moved away from the first housing 20. At this time, the first and second housings 20 and 30 are longitudinally aligned.

In this state, as illustrated in FIGS. 37 to 40, if the user wishes to watch TV or moving images through the large-sized liquid crystal display unit 33 of the mobile phone 10, the second housing 30 is rotated about the second hinge axis A2 so that the second housing 30 is rotated from the longitudinal orientation to the widthwise orientation.

Figure 37:
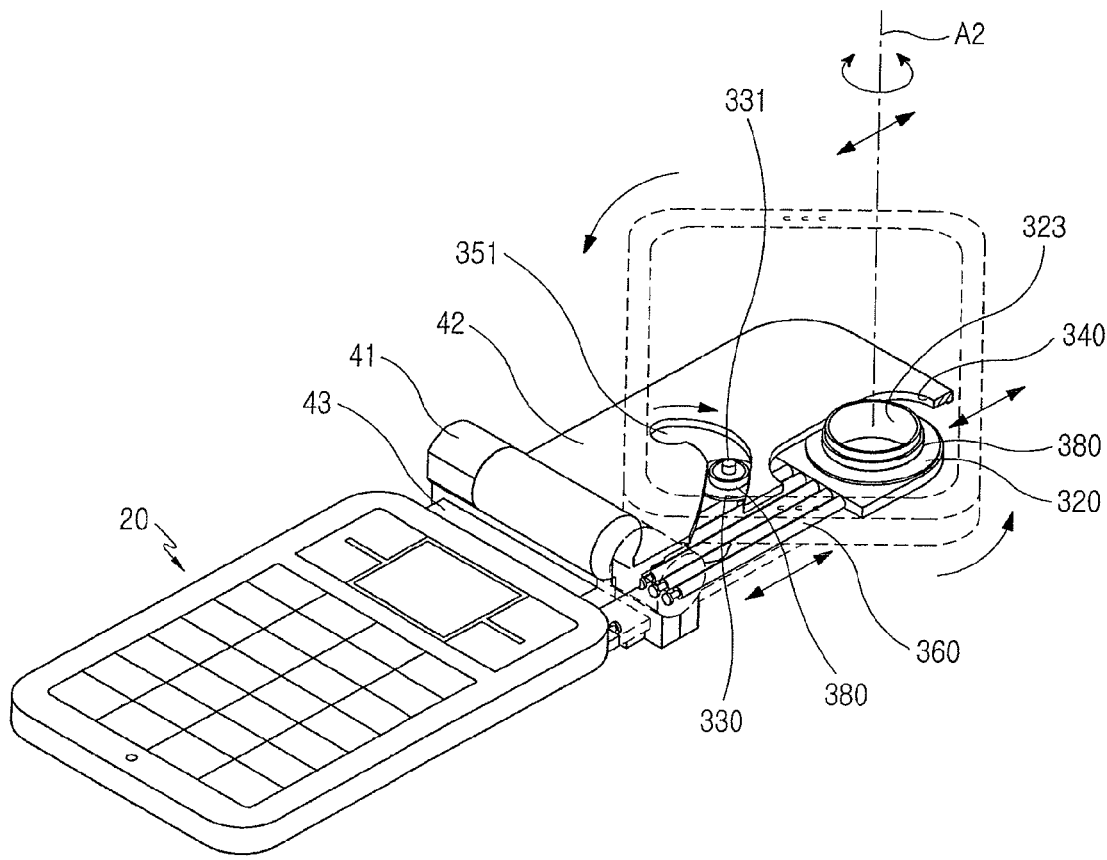
FIG. 37 is a perspective view illustrating a mobile phone having a dual connection member according to an exemplary embodiment of the present invention in the process of rotating the mobile phone about the second hinge axis of the hinge device.
Figure 38:
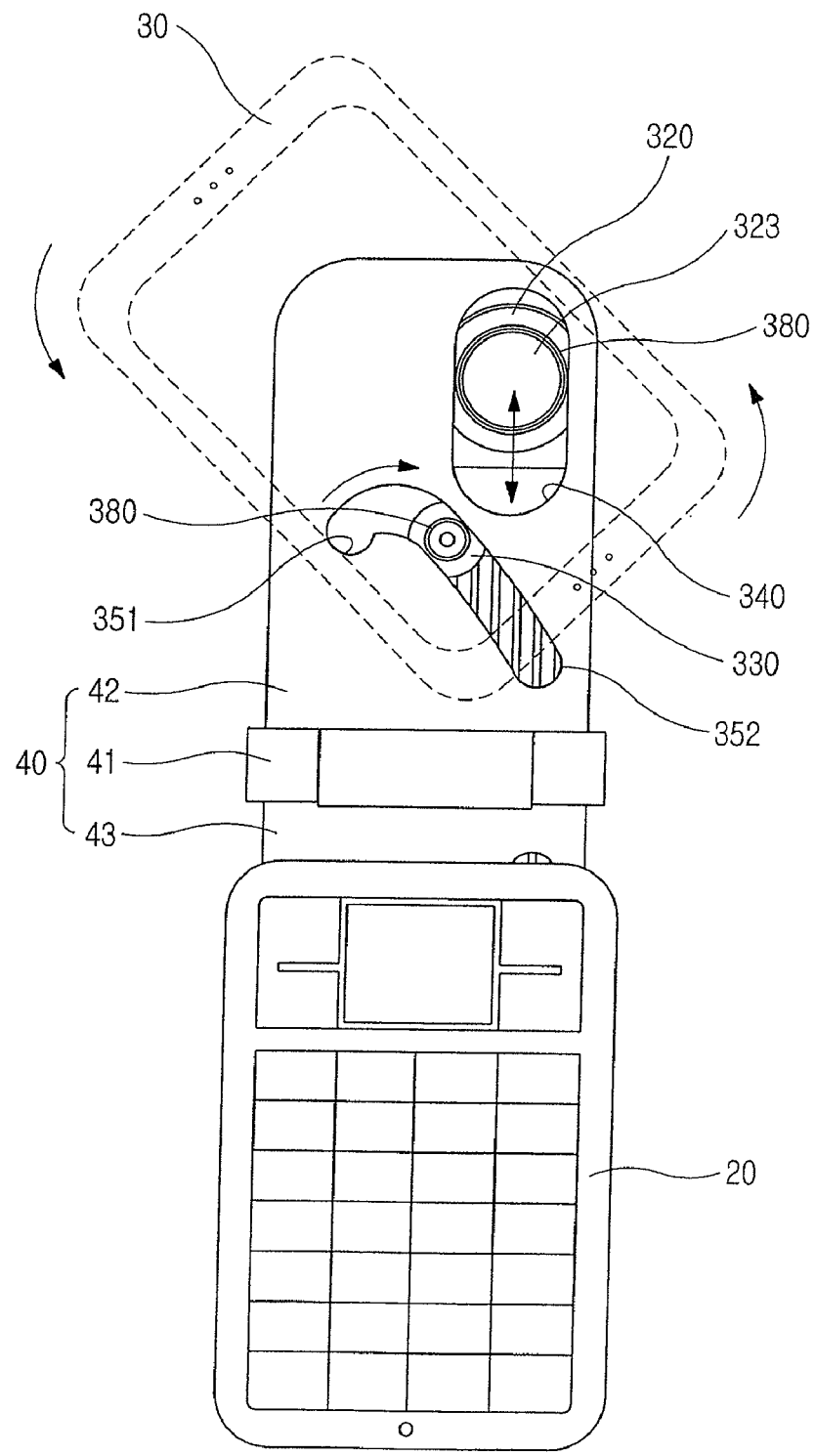
FIG. 38 is a top plan view illustrating a mobile phone having a dual connection member according to an exemplary embodiment of the present invention in the process of rotating the mobile phone about the second hinge axis of the hinge device.

At this time, as illustrated in FIGS. 37 and 38, at the same time when the second housing 30 is rotated, the link members 310 are rotated together with the second housing 30, and the second rotary member 330 is released from a first stopper portion 351 in the second guide portion 350. The first stopper portion 351 is formed by an engagement groove, and the second rotary member 330 is curvilinearly guided by the second guide portion 350 when it is released from the engagement groove.

At this time, as illustrated in FIGS. 37 and 38, at the same time when the second rotary member 330 is released from the first stopper portion 351, the second rotary member 330 is curvilinearly lifted along the longitudinal direction of the second housing 30 by the second guide portion 350, and the first rotary member 320 is also lifted in the longitudinal direction and rectilinearly moved. If so, the elastic member 360 is also rectilinearly moved, thereby producing tension.

At this time, as illustrated in FIG. 38, the second rotary member 330 is lifted by the second guide portion 350 and then curvilinearly moved downward in the longitudinal direction, and the first rotary member 320 is also rectilinearly moved downward in the longitudinal direction.

Figure 39:
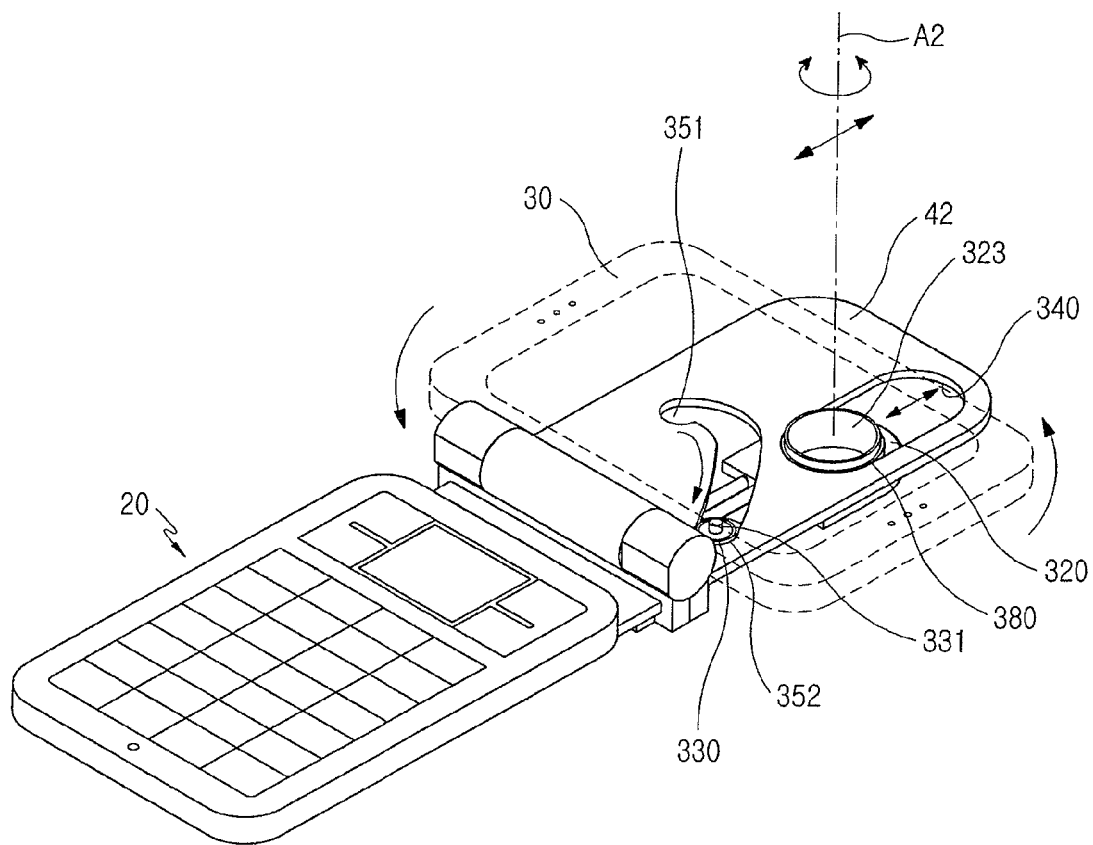
FIG. 39 is a perspective view illustrating a mobile phone having a dual connection member according to an exemplary embodiment of the present invention in a state in which the mobile phone is rotated about the second hinge axis of the hinge device.
Figure 40:
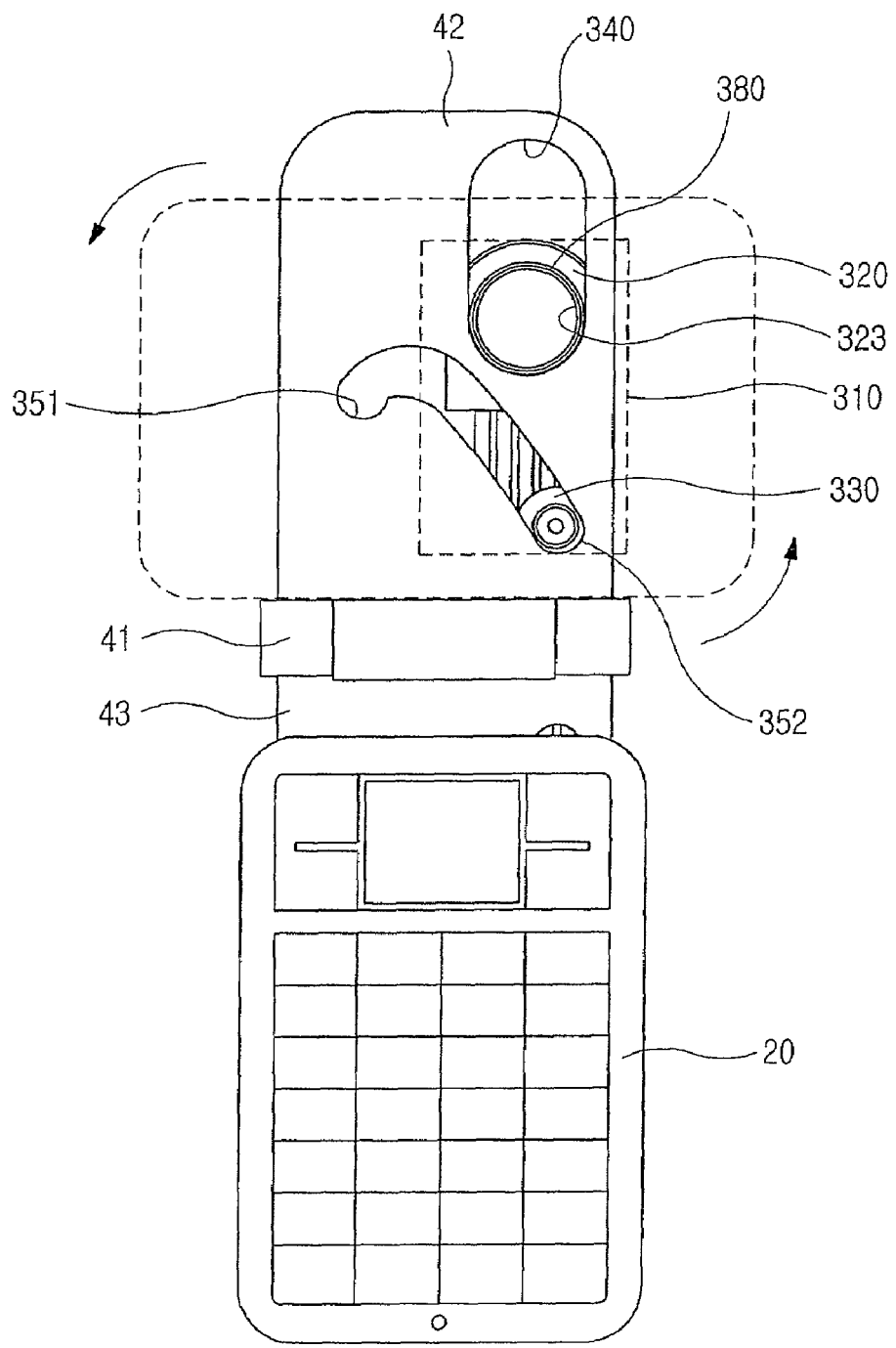
FIG. 40 is a top plan view illustrating a mobile phone having a dual connection member according to an exemplary embodiment of the present invention in a state in which the mobile phone is rotated about the second hinge axis of the hinge device.

At this time, as illustrated in FIGS. 39 and 40, the elastic member 360 pulls the first rotary member 320 with the aid of the tension produced as described above, so that the first rotary member 320 is moved downward in the longitudinal direction to its original position, and the second rotary member 330 comes into contact with a second stopper portion 352 in the second guide portion 350, thereby being stopped.

The second housing 30 is semi-automatically rotated 90 degrees by the elastic member 360.

As illustrated in FIG. 40, the first and second housings are arranged in a "T" shape.

Here, as illustrated in FIGS. 41 to 44, if the user wishes to use the mobile phone 10 in a game mode, the first housing 20 is rotated from the longitudinal orientation to the widthwise orientation about the third hinge axis A3, so as to use the keypad 21 of the first housing 20 with two hands.

Figure 41:
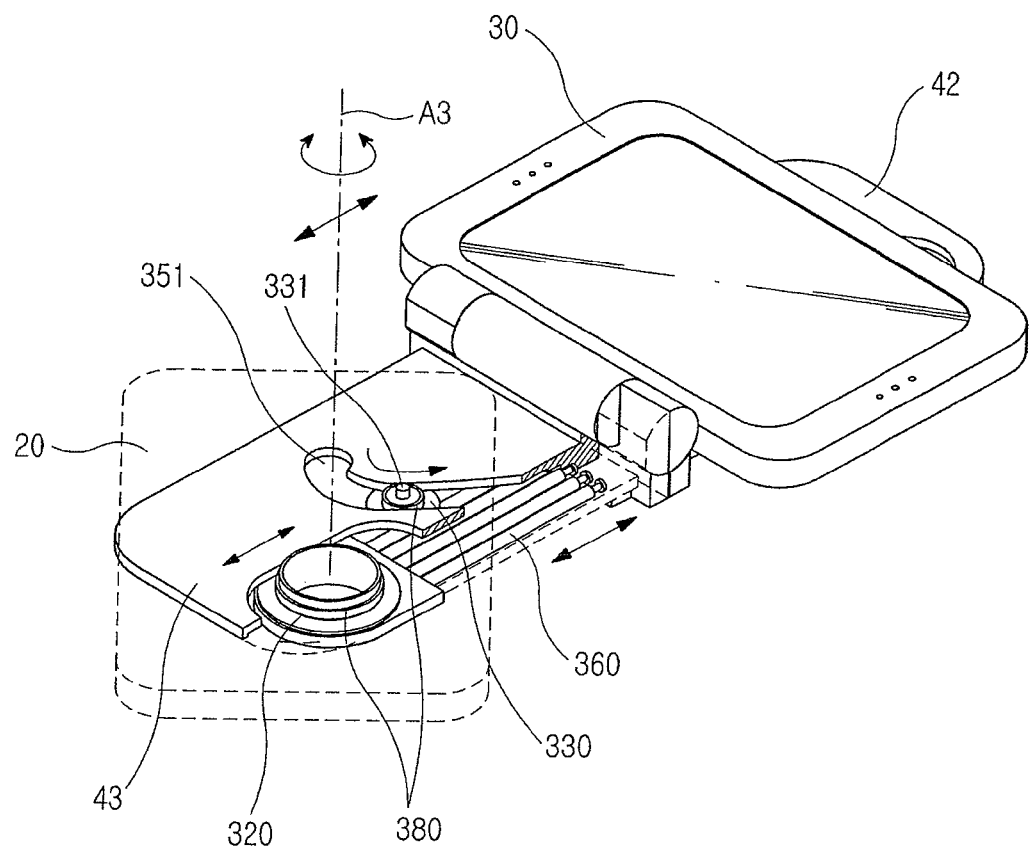
FIG. 41 is a perspective view illustrating a mobile phone having a dual connection member according to an exemplary embodiment of the present invention in the process of rotating the mobile phone about the third hinge axis of the hinge device.
Figure 42:
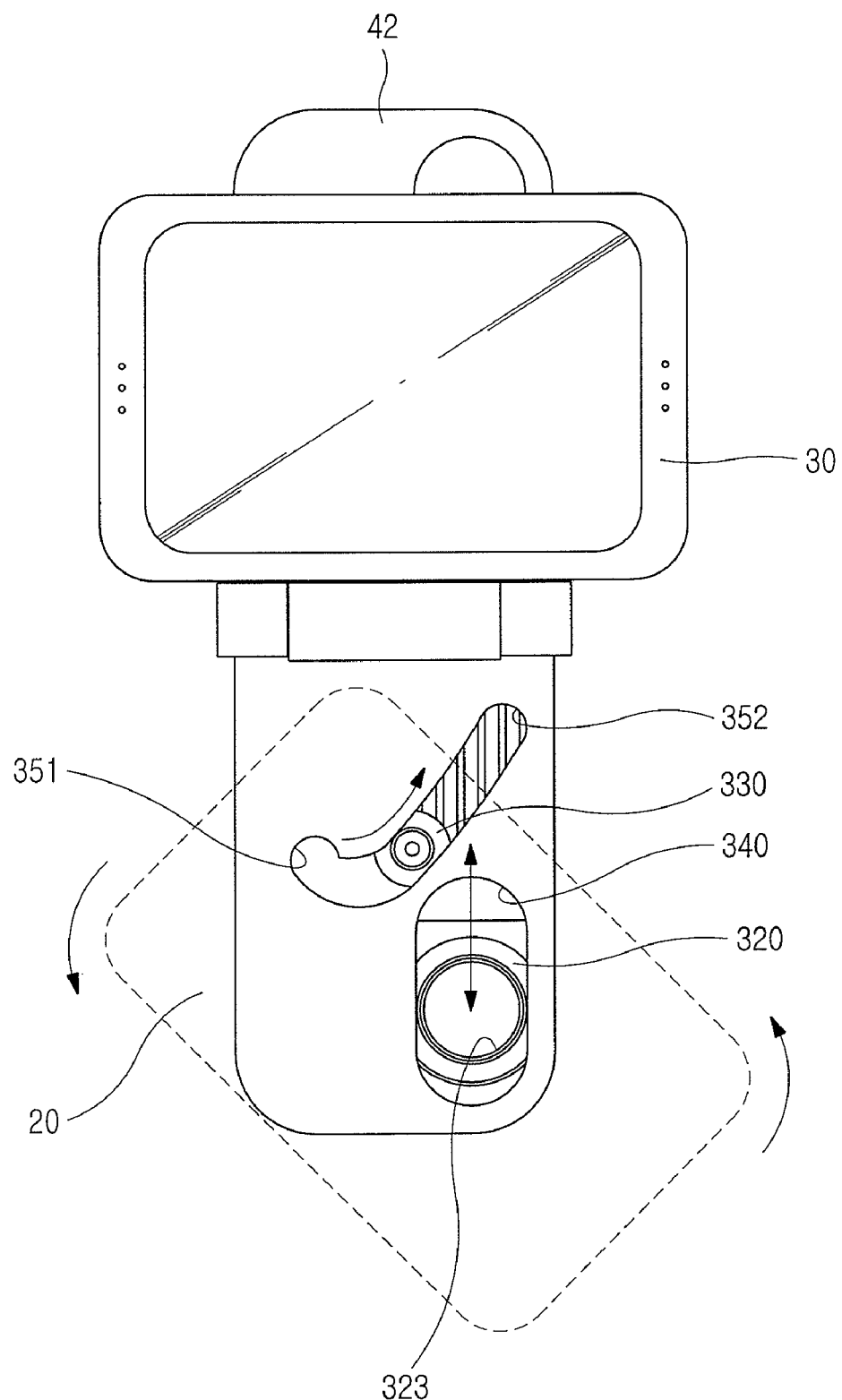
FIG. 42 is a top plan view illustrating a mobile phone having a dual connection member according to an exemplary embodiment of the present invention in the process of rotating the mobile phone about the third hinge axis of the hinge device.

At this time, as illustrated in FIGS. 41 and 42, at the same time when the first housing 20 is rotated, the link members 310 are rotated together with the first housing 20, and the second rotary member 330 is released from the first stopper portion 351 in the second guide portion 350.

Figure 43:
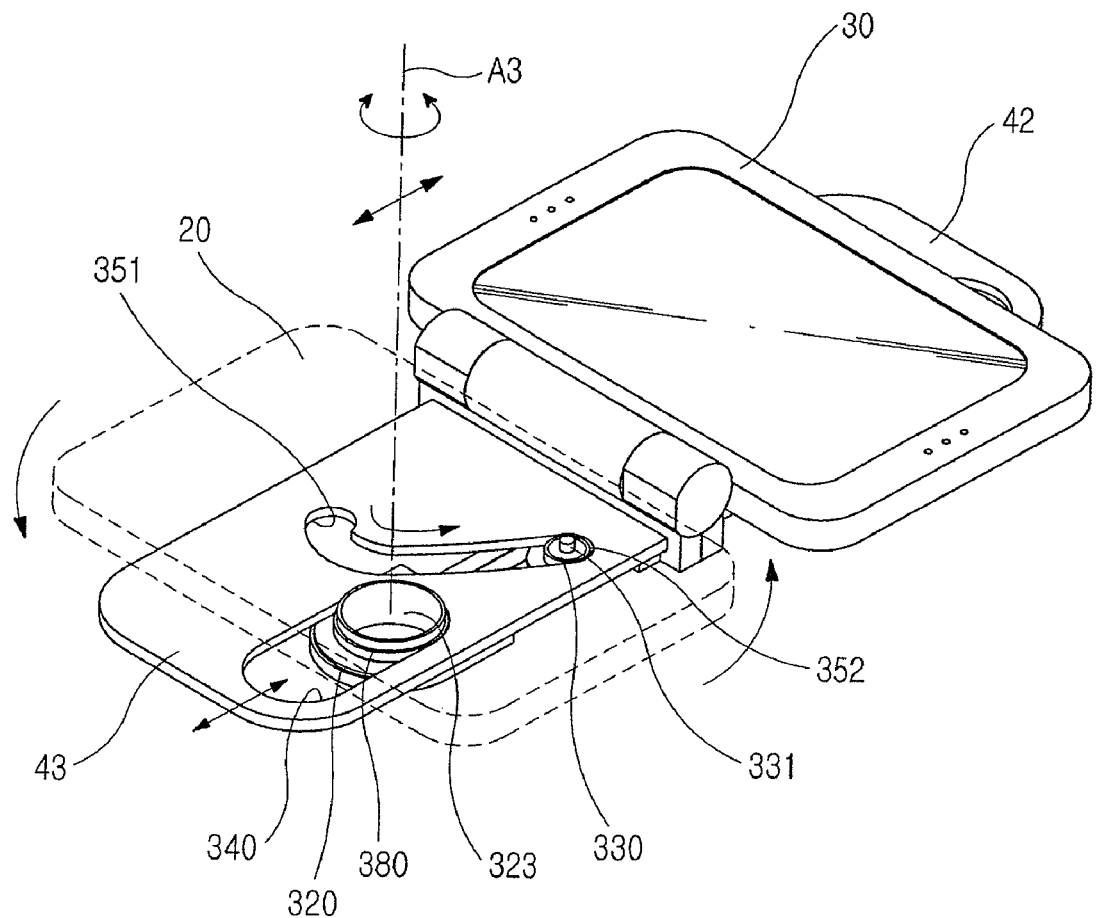
FIG. 43 is a perspective view illustrating a mobile phone having a dual connection member according to an exemplary embodiment of the present invention in a state in which the mobile phone is rotated about the third hinge axis of the hinge device.
Figure 44:
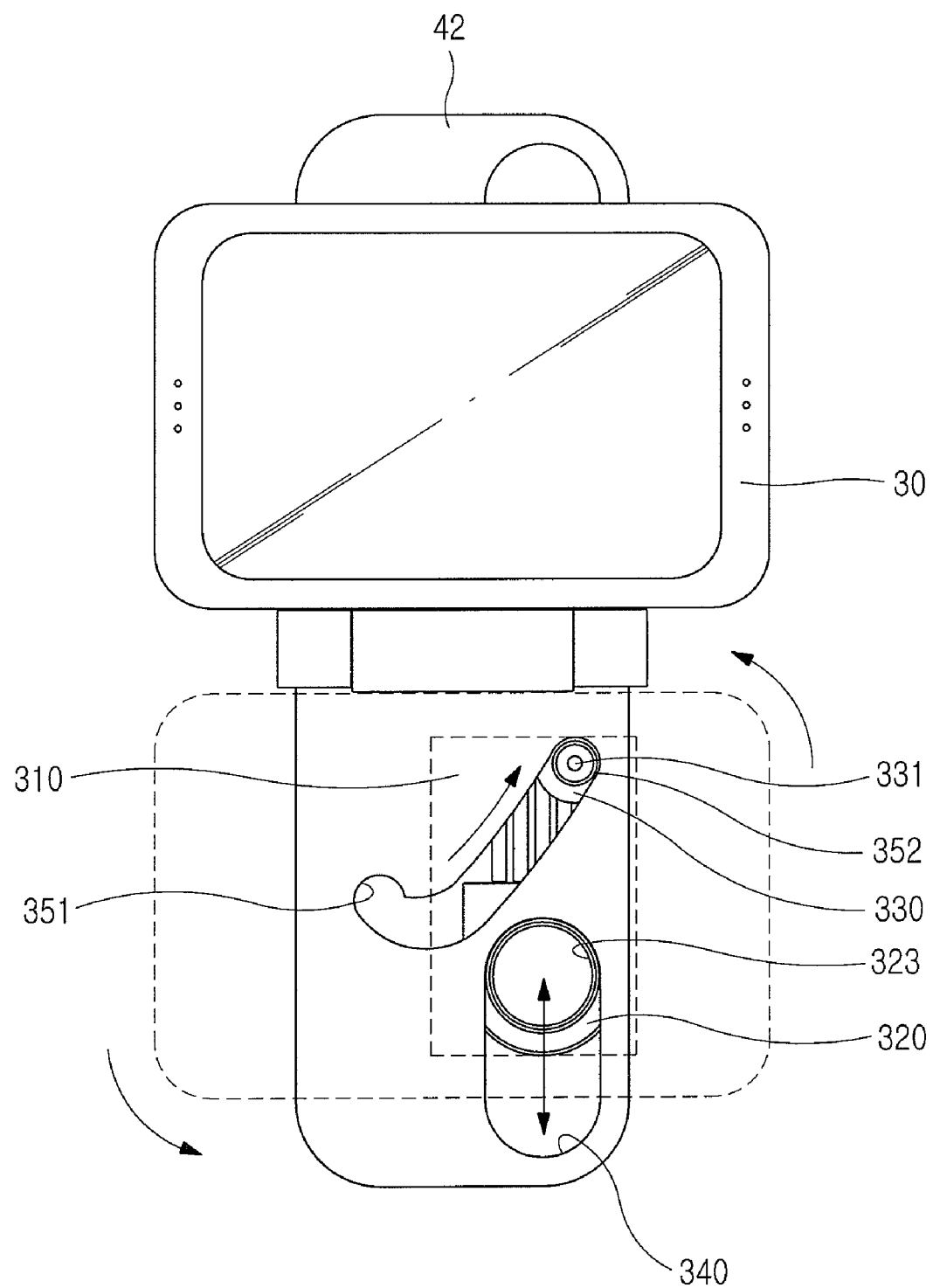
FIG. 44 is a top plan view illustrating a mobile phone having a dual connection member according to an exemplary embodiment of the present invention in a state in which the mobile phone is rotated about the third hinge axis of the hinge device.

As illustrated in FIGS. 43 and 44, the first stopper portion 351 is formed by an engagement groove. When released from the engagement groove, the second rotary member 330 is curvilinearly guided by the first guide portion 340. At this time, at the same time when the second rotary member 330 is released from the first stopper portion 351, the second rotary member 330 is curvilinearly moved downward in the longitudinal direction of the first housing 20 by the second guide portion 350, and the first rotary member 320 is also rectilinearly moved downward in the longitudinal direction. In addition, the elastic member 360 is also rectilinearly moved, thereby producing tension.

As illustrated in FIG. 44, the second rotary member 330 is downwardly moved and then rectilinearly moved upward in the longitudinal direction by the second guide portion 350, and the first rotary member 320 is also rectilinearly moved upward in the longitudinal direction. At this time, the elastic member 360 pulls the first rotary member 320 upward in the longitudinal direction with the aid of the tension produced as described above, so that the first rotary member 320 is moved to its original position, and the second rotary member 330 comes into contact with the second guide portion 352, thereby being stopped.

The first housing 20 is semi-automatically rotated 90 degrees by the elastic member 360.

As illustrated in FIG. 44, the first and second housings 20 and 30 are arranged in an "I" shape.

Here, if it is desired to return the first and second housings 20 and 30 to their original positions again from the widthwise orientation to the longitudinal orientation as illustrated in FIGS. 35 and 36, the first and second housings 20 and 30 are rotated reversely about the second and third hinge axes A2 and A3, respectively. If so, the second rotary member 330 is released from the second stopper portion 352 and curvilinearly moved along the second guide portions 350, and the first rotary member 320 is rectilinearly moved up and down in the longitudinal direction. At this time, the second rotary member 330 is seated in the first stopper portion 351 again, thereby stopping the rotation of the second housing 30.

The elastic member 360 provides elastic force so as to allow the first and second rotary members 320 and 330 to rectilinearly and curvilinearly move.

At this time the first and second rotary members 320 and 330 are semi-automatically returned to their original positions from the widthwise orientation to the longitudinal orientation.

While the invention has been illustrated and described with reference to exemplary embodiments thereof, it will be understood by those skilled in the art that various changes in form and details may be made therein without departing from the spirit and scope of the invention as defined by the appended claims and their equivalents.

What is claimed is:

1. A mobile phone comprising:
    a first housing;
    a second housing; and
    a dual connection member comprising:
        a first connection member for rotatably interconnecting the first housing and the second housing in such a manner that the second housing is rotatable about a first hinge axis toward or away from the first housing;
        a second connection member comprising first guide means and providing a second hinge axis which is eccentrically positioned from the center of the second housing, wherein the second housing is connected to the dual connection member substantially by the second connection member such that the second housing is rotatable about the second hinge axis, and the first guide means allows the second hinge axis to be slid towards and away from the first connection member according to a degree of rotation of the second housing; and
        a third connection member comprising second guide means and providing a third hinge axis which is eccentrically positioned from the center of the first housing, wherein the first housing is connected to the dual connection member substantially by the third connection member in such a manner that the first housing is rotatable about the third hinge axis, and the second guide means allows the third hinge axis to be slid towards and away from the first connection member according to a degree of rotation of the first housing,
    wherein the first and second housings are connected respectively to the third and second connection members while being rotatable about the third and second hinge axes, respectively,
    wherein the third and second hinge axes extend perpendicular to the front and rear faces of the first and second housings and are eccentrically positioned in relation to centers of the first and second housings, respectively, and the dual connection member causes the third and second hinge axes to be slid as the first and second housings are rotated, and
    wherein the first and second guide means each comprise a guide rail slidably gripping outsides of a plurality of guide bars parallel mounted on opposite sides of a guide member, and the first and second guide means each further comprise a structure of a pin in a slot, wherein a shape of the slot determines a path and range of motion of at least one of the first housing and the second housing.

2. A mobile phone as claimed in claim 1, wherein the first housing comprises at least one of a keypad and a microphone.

3. A mobile phone as claimed in claim 1, wherein the second housing comprises a first speaker, and a second speaker and a liquid crystal display unit.

4. A mobile phone as claimed in claim 1, wherein,
    when the mobile phone is to be used in a telecommunication mode, the second housing is rotated about the first axis away from the first housing, so that each of the first and second housings is used in a longitudinal orientation;
    when the liquid crystal display unit is to be used, the second housing is rotated about the second axis from the longitudinal orientation to a transverse orientation, so that the second housing is used in the transverse orientation; and
    when the keypad is to be used, the first housing is rotated about the third hinge axis from the longitudinal orientation to the transverse orientation, so that the first housing is used in the transverse orientation.

5. A mobile phone as claimed in claim 1, wherein:
    if the second housing is rotated about the second hinge axis, the first and second housings are positioned in an arrangement shaped like "T"; and
    if the first and second housings are rotated about the third and second hinge axes, respectively, the first and second housings are positioned in an arrangement shaped like "I".

6. A mobile phone as claimed in claim 1, wherein a rotation angle of the second housing with respect to the first housing can be adjusted between 60 degrees and 135 degrees.

7. A mobile phone as claimed in claim 1, wherein the slot comprises a "J" shape.

8. A mobile phone as claimed in claim 1, wherein the slot comprises a "Y" shape.

9. A hinge device of a mobile phone which comprises a first housing, a second housing, and a dual connection member for interconnecting the first housing and the second housing in such a manner that the second housing is rotatable about a first hinge axis toward or away from the first housing, wherein the first and second housings are connected to the dual connection member while being rotatable about third and second hinge axes, respectively, wherein the third and second hinge axes extend perpendicular to the front and rear faces of the first and second housings and are eccentrically positioned in relation to centers of the first and second housings, respectively, and the dual connection member causes the third and second hinge axes to be slid towards or away from the first hinge axis according to a degree of rotation of the first and second housings, wherein the hinge device comprises:
    a rotary member for substantially connecting at least one of the first housing and the second housing to the dual connection member while providing the second or third hinge axis, wherein the rotary member is slid towards and away from the first hinge axis and rotated together with the first or second housing when the first or second housing rotates;

a guide means formed in the dual connection member so as to guide the rotary member according to rotation of the first or second housing;

a guide movement member connected to the dual connection member, the guide movement member being rotatably connected with the rotary member and guiding the rotary member to slide according to a rotation of the rotary member;

a holder connected with the guide movement member so as to rotatably support the rotary member; and an elastic means provided in the guide movement member, the elastic means providing an elastic force for rotating and sliding the rotary member, wherein the guide movement member comprises a guide rail slidably gripping outsides of a plurality of guide bars parallel mounted on opposite sides of a guide member, and wherein the guide means further comprises a structure of a pin in a slot, wherein a shape of the slot determines a path and range of motion of at least one of the first housing and the second housing.

10. A hinge device as claimed in claim 9, wherein the slot comprises a "Y" shape.

11. A hinge device as claimed in claim 9, wherein the slot comprises a "J" shape.

12. A hinge device as claimed in claim 9, wherein the dual connection member comprises first, second and third connection members, and each of the second and third connection members comprises a mounting recess for receiving a hinge device.

13. A hinge device as claimed in claim 12, wherein the rotary member comprises:

a rotator rotatably connected between the holder and a guide rail of a guide movement member;

a guide pin projecting from the outer circumference of the rotator, engaged in a guide groove comprising the guide means, and performing guide movement when a corresponding one of the first and second housings is rotated; and a washer fitted through the rotator and the guide rail so as to support the rotation of the rotator.

14. A hinge device as claimed in claim 13, wherein a through-hole is formed through a central area of the rotator, through which the washer is fitted, and one or more fastening areas are formed around the through-hole so as to fasten the first or second housing.

15. A hinge device as claimed in claim 13, wherein the guide movement member comprises:

the guide member fitted in a mounting recess, which is formed in a corresponding one of the second and third connection members, so as to slidably guide the guide rail; and the plurality of guide bars mounted on the opposite sides of the guide member so as to be slidably engaged with the guide rail, wherein the guide rail is connected with the holder, and the rotator is rotatably mounted between the holder and the guide rail.

16. A hinge device as claimed in claim 15, wherein a pair of mounting areas are provided at opposite sides of the guide member for mounting the guide bars, respectively, and one or more fastening areas are additionally formed on at least one of the top and the bottom part of the guide member in such a manner as to be fastened to the corresponding one of the second and third connection members.

17. A hinge device as claimed in claim 15, wherein the guide rail comprises a through-hole through which the washer is fitted, and the guide rail further comprises one or more fastening areas, wherein the guide rail is fastened to the corresponding one of the first and second housings by aligning the fastening areas with one or more connection holes formed through the holder and fastening one or more screws through the aligned holes.

18. A hinge device as claimed in claim 15, wherein the elastic means comprises a plurality of spring members, which are positioned between the opposite side areas of the guide rail and the guide member, and one end of each spring member is engaged with one of first spring anchoring members projecting from the opposite side areas of the guide member and the other end is engaged with one of second spring anchoring members projection from the opposite side areas of the guide rail.

19. A hinge device as claimed in claim 18, wherein each of the mounting recesses further comprises one or more spring operation grooves which provides a space for allowing the springs to be moved.

20. A hinge device as claimed in claim 15, wherein the guide member further comprises a pair of dampers, each of which is placed at one end of each of the opposite sides thereof, the dampers absorbing shock occurring when the guide rail is run against the guide member while being moved.

21. A hinge device as claimed in claim 13, wherein:

the guide groove comprises first, second and third stopper areas configured such that the first and third stopper areas comprise ends of the guide groove and the second stopper area comprises an angle in the guide groove;

when the first or second housing is rotated from the transverse orientation to the longitudinal orientation about the third or second axis, the first stopper area comes into contact with the guide pin, thereby stopping the guide movement of the guide pin;

when the guide pin performs the guide movement along the guide groove, the guide pin enters the second stopper area from a first direction and then escapes from the second stopper area in a second direction, thereby passing by the second stopper area; and when the first or second housing is rotated from the longitudinal orientation to the transverse orientation, the third stopper area comes into contact with the guide pin, thereby stopping the guide movement of the guide pin.

22. A hinge device as claimed in claim 12, wherein the guide means comprises a guide groove which is formed in a corresponding mounting recess so as to guide the rotary member when the first or second housing is rotated.

23. A hinge device as claimed in claim 22, wherein:

the guide groove comprises first, second and third stopper areas configured such that the first and third stopper areas comprise ends of the guide groove and the second stopper area comprises an angle in the guide groove;

when the first or second housing is rotated from the transverse orientation to the longitudinal orientation about the third or second axis, the first stopper area comes into contact with the guide pin, thereby stopping the guide movement of the guide pin;

when the guide pin performs the guide movement along the guide groove, the guide pin enters the second stopper area from a first direction and then escapes from the second stopper area in a second direction, thereby passing by the second stopper area; and when the first or second housing is rotated from the longitudinal orientation to the transverse orientation, the third stopper area comes into contact with the guide pin, thereby stopping the guide movement of the guide pin.

* * * * *